United States Patent
Clark et al.

(10) Patent No.: US 10,740,034 B2
(45) Date of Patent: *Aug. 11, 2020

(54) FRONT-END QUALITY OF SERVICE DIFFERENTIATION IN DATA SYSTEMS

(71) Applicant: Liqid Inc., Broomfield, CO (US)

(72) Inventors: Phillip Clark, Boulder, CO (US); James Scott Cannata, Denver, CO (US); Jason Breakstone, Broomfield, CO (US)

(73) Assignee: Liqid Inc., Broomfield, CO (US)

( * ) Notice: Subject to any disclaimer, the term of this patent is extended or adjusted under 35 U.S.C. 154(b) by 5 days.

This patent is subject to a terminal disclaimer.

(21) Appl. No.: 16/259,453

(22) Filed: Jan. 28, 2019

(65) Prior Publication Data

US 2019/0171395 A1    Jun. 6, 2019

Related U.S. Application Data

(63) Continuation of application No. 15/139,616, filed on Apr. 27, 2016, now Pat. No. 10,191,691.

(60) Provisional application No. 62/153,597, filed on Apr. 28, 2015.

(51) Int. Cl.
 *G06F 12/00* (2006.01)
 *G06F 3/06* (2006.01)

(52) U.S. Cl.
 CPC ............ *G06F 3/0659* (2013.01); *G06F 3/061* (2013.01); *G06F 3/067* (2013.01)

(58) Field of Classification Search
 None
 See application file for complete search history.

(56) References Cited

U.S. PATENT DOCUMENTS

| | | | |
|---|---|---|---|
| 5,828,207 | A | 10/1998 | Saadeh |
| 6,061,750 | A | 5/2000 | Beardsley et al. |
| 6,325,636 | B1 | 12/2001 | Hipp et al. |
| 7,243,145 | B1 | 7/2007 | Poortman |
| 7,260,487 | B2 | 8/2007 | Brey et al. |
| 7,505,889 | B2 | 3/2009 | Salmonsen et al. |
| 7,606,960 | B2 | 10/2009 | Munguia |
| 7,725,757 | B2 | 5/2010 | Padweka et al. |
| 7,877,542 | B2 | 1/2011 | Chow et al. |
| 8,125,919 | B1 | 2/2012 | Khanka et al. |
| 8,150,800 | B2 | 4/2012 | Webman et al. |
| 8,656,117 | B1 | 2/2014 | Wong et al. |

(Continued)

OTHER PUBLICATIONS

Aragon, Juan L. et al., "Control Speculation for Energy-Efficient Next-Generation Superscalar Processors," IEEE Transactions on Computers, vol. 55, No. 3, pp. 281-291, Mar. 2006.

(Continued)

*Primary Examiner* — Daniel D Tsui

(57) ABSTRACT

Systems, methods, apparatuses, and software for data storage systems are provided herein. In one example, a data storage apparatus includes a processor configured to assign service levels in a queue for handling storage operations directed to one or more data storage drives. The processor can pre-allocate resources in the queue for selected ones of the service levels before ones of the storage operations associated with the selected ones of the service levels are received by the processor. The processor receives the storage operations, and based at least on the service levels, services the storage operations from the queue with the one or more data storage drives.

20 Claims, 8 Drawing Sheets

(56) References Cited

U.S. PATENT DOCUMENTS

| | | |
|---|---|---|
| 8,688,926 B2 | 4/2014 | Breakstone et al. |
| 8,880,771 B2 | 11/2014 | Subramaniyan et al. |
| 9,602,437 B1 | 3/2017 | Bernath |
| 2002/0059428 A1 | 5/2002 | Susai et al. |
| 2003/0110423 A1 | 6/2003 | Helms et al. |
| 2003/0126478 A1 | 7/2003 | Burns et al. |
| 2005/0223136 A1 | 10/2005 | Tanaka et al. |
| 2006/0277206 A1 | 12/2006 | Bailey et al. |
| 2007/0067432 A1 | 3/2007 | Tarui et al. |
| 2008/0034153 A1 | 2/2008 | Lee et al. |
| 2008/0162735 A1 | 7/2008 | Voigt et al. |
| 2008/0198744 A1 | 8/2008 | Menth |
| 2008/0281938 A1 | 11/2008 | Rai et al. |
| 2009/0006837 A1 | 1/2009 | Rothman et al. |
| 2009/0100280 A1 | 4/2009 | Lindsay |
| 2009/0190427 A1 | 7/2009 | Brittain et al. |
| 2009/0193201 A1 | 7/2009 | Brittain et al. |
| 2009/0193203 A1 | 7/2009 | Brittain et al. |
| 2009/0276551 A1 | 11/2009 | Brown et al. |
| 2010/0088467 A1 | 4/2010 | Lee et al. |
| 2011/0289510 A1 | 11/2011 | Lin et al. |
| 2011/0299317 A1 | 12/2011 | Shaeffer et al. |
| 2011/0320861 A1 | 12/2011 | Bayer et al. |
| 2012/0030544 A1 | 2/2012 | Fisher-Jeffes |
| 2012/0054760 A1 | 3/2012 | Chung |
| 2012/0089854 A1 | 4/2012 | Breakstone et al. |
| 2012/0151118 A1 | 6/2012 | Flynn et al. |
| 2012/0166699 A1 | 6/2012 | Kumar |
| 2012/0210163 A1 | 8/2012 | Cho |
| 2012/0317433 A1 | 12/2012 | Ellis et al. |
| 2013/0132643 A1 | 5/2013 | Huang |
| 2013/0185416 A1 | 7/2013 | Larkin et al. |
| 2014/0047166 A1 | 2/2014 | Asnaashari et al. |
| 2014/0056319 A1 | 2/2014 | Hellwig |
| 2014/0059265 A1 | 2/2014 | Iyer et al. |
| 2014/0075235 A1 | 3/2014 | Chandhoke et al. |
| 2014/0103955 A1 | 4/2014 | Avritch et al. |
| 2014/0108846 A1 | 4/2014 | Berke et al. |
| 2014/0365714 A1 | 12/2014 | Sweere et al. |
| 2015/0074322 A1 | 3/2015 | Galles |
| 2015/0121115 A1 | 4/2015 | Chandra et al. |
| 2015/0186437 A1 | 7/2015 | Molaro |
| 2015/0212755 A1 | 7/2015 | Asnaashari |
| 2015/0304423 A1 | 10/2015 | Satoyama et al. |
| 2015/0324118 A1 | 11/2015 | McCambridge et al. |
| 2015/0373115 A1 | 12/2015 | Breakstone et al. |
| 2016/0197996 A1 | 7/2016 | Barton et al. |
| 2016/0248631 A1 | 8/2016 | Duchesneau |

OTHER PUBLICATIONS

International Application No. PCT/US2017/046602, International Search Report & Written Opinion, 8 pages, dated Oct. 19, 2017.
International Application No. PCT/US2017/046607, International Search Report & Written Opinion, 7 pages, dated Oct. 23, 2017.
Lu, Yingping et al., "Performance Study of iSCSI-Based Storage Subsystems," IEEE Communications Magazine, pp. 76-82, Aug. 2003.

FRONT-END QUALITY OF SERVICE DIFFERENTIATION IN DATA SYSTEMS

RELATED APPLICATIONS

This application is a continuation of, and claims priority to, U.S. patent application Ser. No. 15/139,616, entitled "FRONT-END QUALITY OF SERVICE DIFFERENTIATION IN STORAGE SYSTEM OPERATIONS," and filed Apr. 27, 2016. This application also hereby claims the benefit of priority to U.S. Provisional Patent Application 62/153,597, titled "FRONT-END QUALITY OF SERVICE DIFFERENTIATION IN STORAGE SYSTEM OPERATIONS," filed Apr. 28, 2015, which is hereby incorporated by reference in its entirety.

BACKGROUND

Computer systems typically include bulk storage systems, such as magnetic disc drives, optical storage devices, tape drives, or solid state storage drives, among other storage systems. In these computer systems, a host system, such as a network device, server, or end-user computing device, communicates with external bulk storage systems to store data or to access previously stored data. These bulk storage systems are traditionally limited in the number of devices that can be included per host and also have large physical space requirements due to the separate physical packaging of individual storage drives, which can be problematic in storage environments where higher capacity, redundancy, and reliability is desired.

Networked computer systems typically include network interface equipment, such as network interface cards, which provide physical access to one or more packet or frame-based networks, such as Ethernet. This interface equipment can be controlled by software, such as operating systems, drivers, and the like, to handle the various network traffic that traverses the network interfaces and an associated network stack. Front-end buffering and queue systems are inefficient for storage transaction handling with respect to associated storage devices. These shortcomings can be especially pronounced with the increasing data storage and retrieval needs in networked, cloud, and enterprise environments.

OVERVIEW

Systems, methods, apparatuses, and software for data storage systems are provided herein. In one example, a data storage apparatus includes a processor configured to assign service levels in a queue for handling storage operations directed to one or more data storage drives. The processor can pre-allocate resources in the queue for selected ones of the service levels before ones of the storage operations associated with the selected ones of the service levels are received by the processor. The processor receives the storage operations, and based at least on the service levels, services the storage operations from the queue with the one or more data storage drives.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
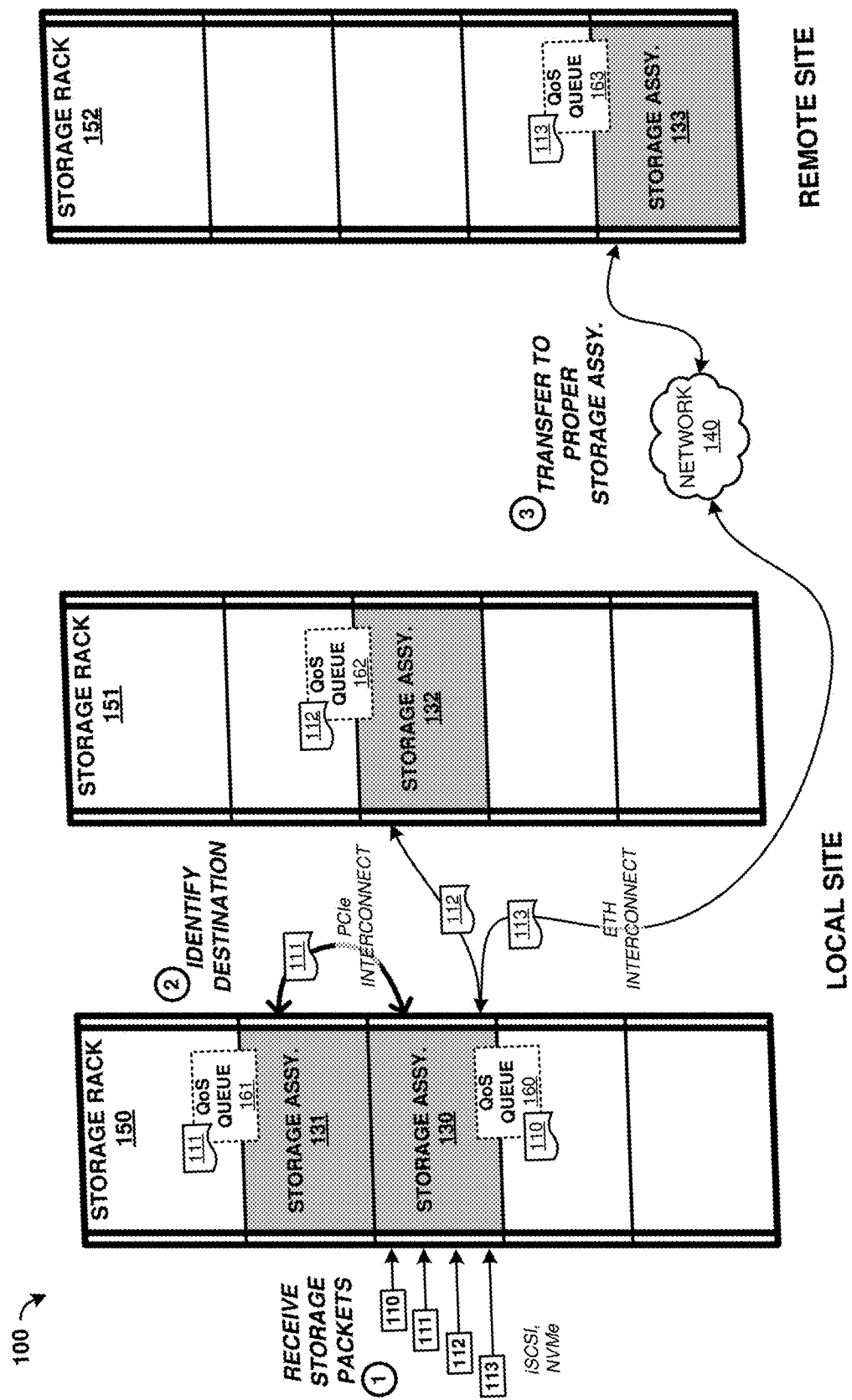
FIG. 1 is a system diagram illustrating a storage system.

Data storage devices store and retrieve data for end users. In some examples, data storage devices can be connected over network links to end user systems that are remote from the data storage equipment. These network links can be provided over one or more network interfaces, such as network interface cards (NICs), or other network transceiver equipment. In the examples herein, storage transactions or storage operations for the data storage devices can be received over network interfaces for storage of associated data into the data storage devices. These storage operations are encapsulated into one or more frames or packets, depending upon the protocols employed, and can be transferred over network links, routers, and other network equipment between the end user systems and the data storage systems.

In examples where Ethernet is employed over a network link, various Ethernet frames carry the storage operations including any associated data. These frames can be received over a network link and into a network interface of a storage system and passed through several layers of processing by a network stack, such as in an OSI 7-layer protocol model that includes the Application, Presentation, Session, Transport, Network, Data link, and Physical layers.

In typical network systems, such as a network stack or network driver provided in an operating system executed by a processor, a single global buffer pool is employed to handle transferring and processing of the network frames or packets between the various layers of the network stack and also for use by the application thread that is associated with the storage operations, such as a data storage application. For example, in certain Linux operating systems, a "sk_buf" data structure is employed in this manner, while in BSD-based operating systems, an "mbuf" is employed.

When multi-threaded processes or applications are employed on the processor or processing system, then each thread can be handling different storage operations concurrently. However, since a single global buffer is typically employed, then a resource locking mechanism is employed to ensure data integrity and no overlapping handling of the same data at the same time in the global buffer. For example, if a first layer of the network stack wishes to process a frame received into the global buffer, then that first layer will establish a resource lock for the global buffer which prevents other processes or layers from using the global buffer at that time. Once the first layer has finished processing the frame, then the resource lock can be released which can allow other layers or processes to then establish exclusivity for any processing associated with that other layer or process. In this manner, a data frame can be handed off for processing between the various layers of a network stack using the global buffer as a common data exchange location. Likewise, if the data frames are associated with a storage operation, then a storage application can use the global buffer to transfer the data into a storage device once the data frames have progressed up the network stack accordingly.

However, when high-volumes of data traffic are employed with multi-threaded applications, then bottlenecks can occur when using the global buffer with the single resource lock. Furthermore, some threads may seek to have a higher priority above other threads, but are blocked from being serviced by other lower-priority threads. Thus, a global buffer can present bottlenecks in high-volume environments. Additionally, when multi-threaded processing is employed, then the various threads of an application can also increase the volume and associated bottlenecks when using the global buffer across the various threads.

Ethernet drivers, such as those employed for 10 Gbps or 40 Gbps links, can use a message signal interrupt (MSI) or enhanced MSI (MSI-X) mechanism that allow for multiple interrupt thread contexts that execute in parallel when servicing storage operations (I/Os). The Ethernet driver typically has a unique kernel thread context for each MSI-X vector, but all kernel threads share the same buffer pool, as described above. In the examples below, an enhanced Ethernet driver is presented which assigns priority based on various properties of received storage transactions, such as logical units (LUNs), iSCSI properties, volumes, network addresses, or other factors, including combinations thereof. In further examples, the examples below can associate each MSI-X thread context with a unique receive buffer list and other kernel resources used to receive and handle Ethernet frames, and assign priorities or quality of service levels to these thread contexts. As mentioned above, traditional kernels have a single network receive buffer list used by all network drivers and each driver's MSI-X thread context (i.e. mbufs in FreeBSD and skbuffs in Linux). In the examples below, a unique network buffer list per MSI-X thread context is established with modified kernel network buffer routines that allocate and free network buffers to take/append each buffer to the appropriate list.

Various enhancements remove contention of the single buffer list being used by multiple thread contexts in traditional buffer designs. Thus, for each driver and each MSI-X for each driver, many threads—such as 4 or 8 different thread contexts—would no longer contend for the same buffer list and associated kernel resources. This can lead to more parallelism and throughput potential, rather than having multiple thread contexts waiting to access a single buffer list for each received frame.

Typically, these transaction queues are first-in first-out (FIFO) type of queues, with storage operations that are received earlier in the handled before storage operations received later in time. However, in the examples below, an out-of-order handling of storage operations in each transaction queue is discussed. This out-of-order handling can be determined based on a service priority assigned to the storage operations, such as a quality-of-service (QoS) priority identified for each of the storage operations. This service priority can prioritize handling of certain storage operations ahead of other storage operations. The service priority can be established for storage operations associated with various properties, such as a particular data application, end user parameter, data source, data target identifier, logical storage unit (LUN), or other properties.

In a first example, FIG. 1 is presented. FIG. 1 is a system diagram illustrating storage system 100. Storage system 100 includes several storage racks comprising one or more storage assemblies for storing and retrieving data. Storage rack 150 includes storage assembly 130 and storage assembly 131. Storage rack 151 includes storage assembly 132. Storage assembly 152 includes storage assembly 133. Each storage rack can include physical support structures as well as temperature control features such as venting, fans, and the like. Each storage assembly includes a plurality of storage drives, such as solid state storage devices, as well as processors and various interconnect circuitry and power supply equipment. Further examples of these storage assemblies are discussed in the figures below.

Storage operations, such as write operations or read operations, are received by any of the storage assemblies in FIG. 1. These storage assemblies then direct the storage operations toward appropriate storage drives that ultimately execute the write operations or read operations. However, in the examples herein, the storage drives that are associated with a particular storage operation might not be located in the storage assembly in which the storage operation is received initially. In this manner, any storage assembly can receive a storage operation that is ultimately handled in storage drives of another storage assembly. Four example storage operations are discussed below for FIG. 1.

Each storage assembly 131-133, among other storage assemblies not shown in FIG. 1 for clarity, are interconnected using one or more communication links. In some examples, these communication links comprise external Peripheral Component Interconnect Express (PCIe) links, such as the link between storage assembly 130 and storage assembly 131. In another example, Ethernet links are employed, such as links between storage assembly 130 and 132 or between storage assembly 130 and storage assembly 133 over network 140. The Ethernet links can comprise TCP/IP (Transmission Control Protocol/Internet Protocol) links or other network links, such as Infiniband, FibreChannel, Thunderbolt, or other links, including combinations thereof.

Figure 2:
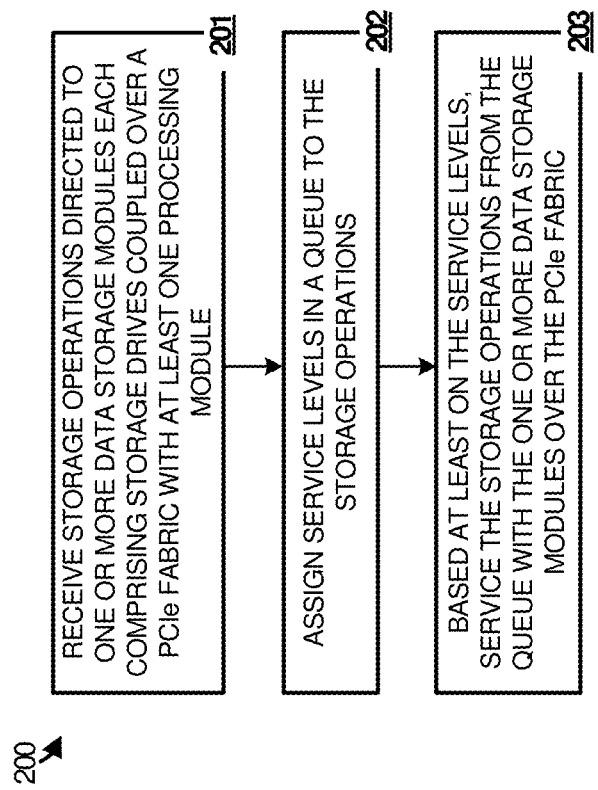
FIG. 2 is a flow diagram illustrating example operation for a storage system.

To further illustrate the operation of FIG. 1, FIG. 2 is presented. FIG. 2 is a flow diagram illustrating example operation for a storage system, such as system 100. In FIG. 2, storage assemblies receive (201) storage operations directed to one or more data storage modules each comprising storage drives coupled over an associated PCIe fabric with at least one associated processing module. Examples of the PCIe fabric and various module interconnect is shown in FIGS. 3-5 and 8 below.

Storage operations are each received over a network interface associated with a storage assembly, and any of storage assemblies 130-133 can receive storage operations. These storage operations can be transferred by one or more host systems over one or more networks or storage interfaces, not shown in FIG. 1 for clarity. In this example, FIG. 1 shows storage assembly 130 receiving storage operations 110-113. These storage operations can comprise iSCSI (Internet Small Computer System Interface) storage operations received over a TCP/IP link. In other examples, these storage operations comprise NVMe (NVM Express) storage operations.

Once these storage operations are received in a storage assembly, a processing module included therein identifies a destination for the storage operation. The destination might be for storage drives managed by the storage assembly that receives the storage operation. The destination might instead be for storage drives managed by a storage assembly other than the one that receives the storage operation. Regardless of which storage assembly handles or manages the storage drives that are associated with the storage operation, each storage assembly includes a transaction queue for storing the storage operations before handling by processing modules of the storage assembly. In some examples, these transaction queues are first-in first-out (FIFO) type of queues, with storage operations that are received earlier in the handled before storage operations received later in time.

However, in the examples below, each storage assembly assigns (202) service levels in an associated queue to associated storage operations. An out-of-order handling of storage operations in each transaction queue is discussed. This out-of-order handling can be determined based on a priority assigned to the storage operations, namely a quality-of-service (QoS) priority identified for each of the storage operations. This QoS priority can prioritize handling of certain storage operations ahead of other storage operations. The QoS priority can be established for storage operations associated with various properties, such as a particular data application, end user parameter, data source, data target identifier, logical storage unit (LUN), or other properties.

Thus, any storage operation received over an external network interface or external storage interface of storage assembly 130 (or any other storage assembly) can be either managed by the receiving storage assembly or transferred to another storage assembly. Storage operations can comprise iSCSI storage packets that further comprise a storage operation and are received in a first storage assembly. These iSCSI storage packets can transferred to another storage assembly so that the other storage assembly acts as if it had received the iSCSI storage packets originally. The iSCSI storage packets can be associated with a particular logical unit (LUN), where many LUNs are handled by storage system 100. Each LUN can have a different priority associated therewith, and can be handled by an associated processing module according to the priority in an associated queue.

Based at least on the service levels, storage the storage assemblies each services (203) the storage operations from an associated queue with associated data storage modules over an associated PCIe fabric. For storage packets associated with storage operation 110 that are received by storage assembly 130, storage assembly 130 determines that storage assembly itself manages the storage drives for storage operation 110. Storage operation 110 can be handled over an internal PCIe fabric of storage assembly 130, such the PCIe fabric described below for FIG. 8. Storage operation 110 is placed into a priority-based queue 160 for a processing module of storage assembly 130. This priority-based queue 160 can be operated to de-queue storage operations based on a priority or QoS factor, once de-queued, the storage operations are handled by an associated processing module of storage assembly 130, such as a write operation or a read operation for internal storage drives.

For storage packets received for storage operation 111, storage assembly 130 determines that storage assembly 131 manages the storage drives for storage operation 111. Storage operation 111 is transferred over an external PCIe interconnect link to storage assembly 131. Storage assembly 131 then handles storage operation 111 over an internal PCIe fabric of storage assembly 131. Storage operation 111 is placed into a priority-based queue 161 for a processing module of storage assembly 131. This priority-based queue 161 can be operated to de-queue storage operations based on a priority or QoS factor, once de-queued, the storage operations are handled by an associated processing module of storage assembly 131, such as a write operation or a read operation for internal storage drives.

For storage packets received for storage operation 112, storage assembly 130 determines that storage assembly 132 manages the storage drives for storage operation 112. Storage operation 112 is transferred over an external Ethernet interconnect link to storage assembly 132. Storage assembly 132 then handles storage operation 112 over an internal PCIe fabric of storage assembly 132. Storage operation 112 is placed into a priority-based queue 162 for a processing module of storage assembly 132. This priority-based queue 162 can be operated to de-queue storage operations based on a priority or QoS factor, once de-queued, the storage operations are handled by an associated processing module of storage assembly 132, such as a write operation or a read operation for internal storage drives.

For storage packets received for storage operation 113, storage assembly 130 determines that storage assembly 133 manages the storage drives for storage operation 113. Storage operation 113 is transferred over an external Ethernet interconnect link and network 130 to storage assembly 133. Storage assembly 133 then handles storage operation 113 over an internal PCIe fabric of storage assembly 133. Storage operation 113 is placed into a priority-based queue 163 for a processing module of storage assembly 133. This priority-based queue 163 can be operated to de-queue storage operations based on a priority or QoS factor, once de-queued, the storage operations are handled by an associated processing module of storage assembly 133, such as a write operation or a read operation for internal storage drives. Network 130 can comprise one or more packet networks which can include the Internet. As shown in FIG. 1, storage rack 150 and storage rack 151 are located together at a local site, while storage rack 152 is located at a remote site.

Figure 3:
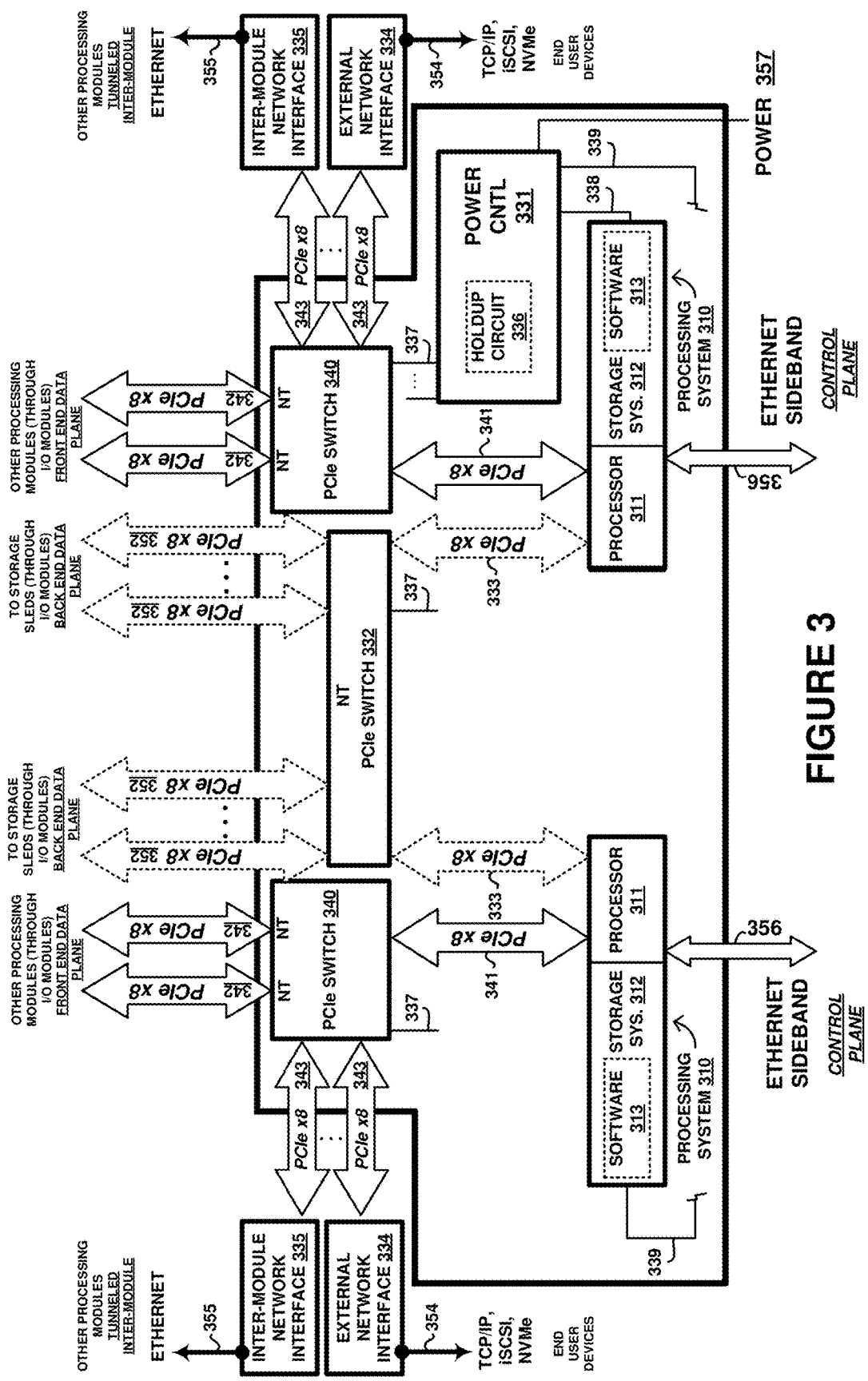
FIG. 3 is a block diagram illustrating a processing module.
Figure 4:
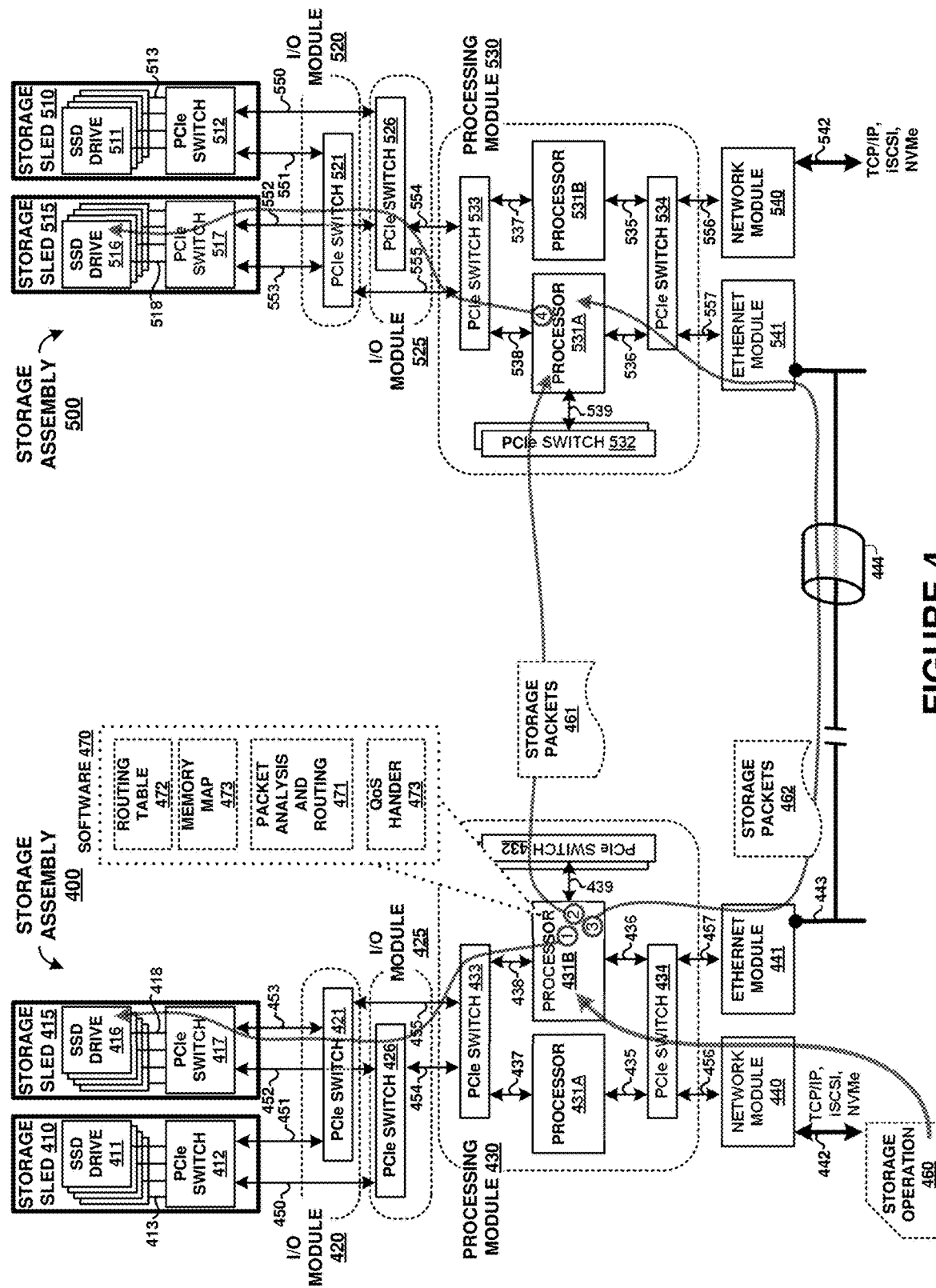
FIG. 4 is a system diagram illustrating a storage system.
Figure 5:
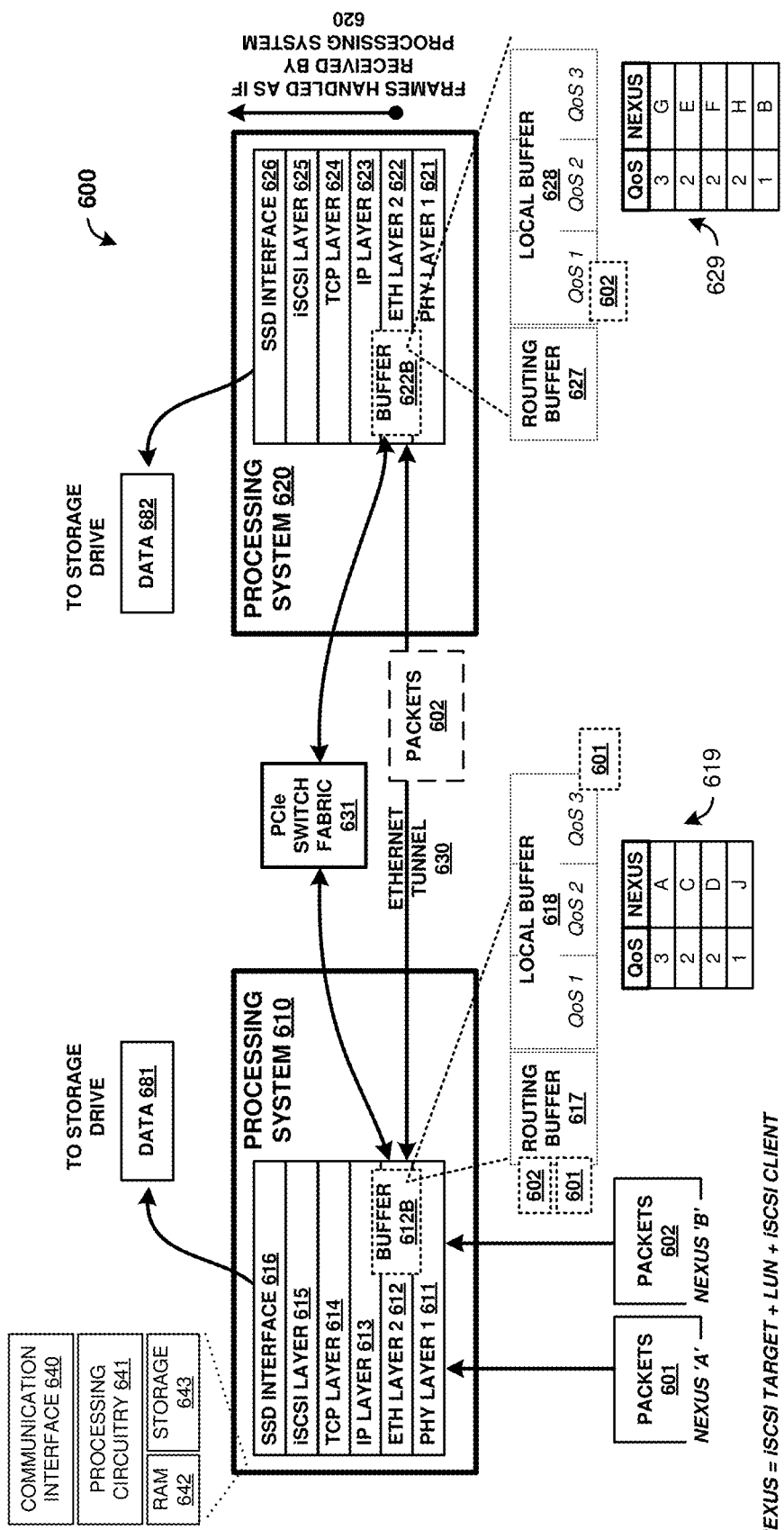
FIG. 5 is a system diagram illustrating a storage system.
Figure 8:
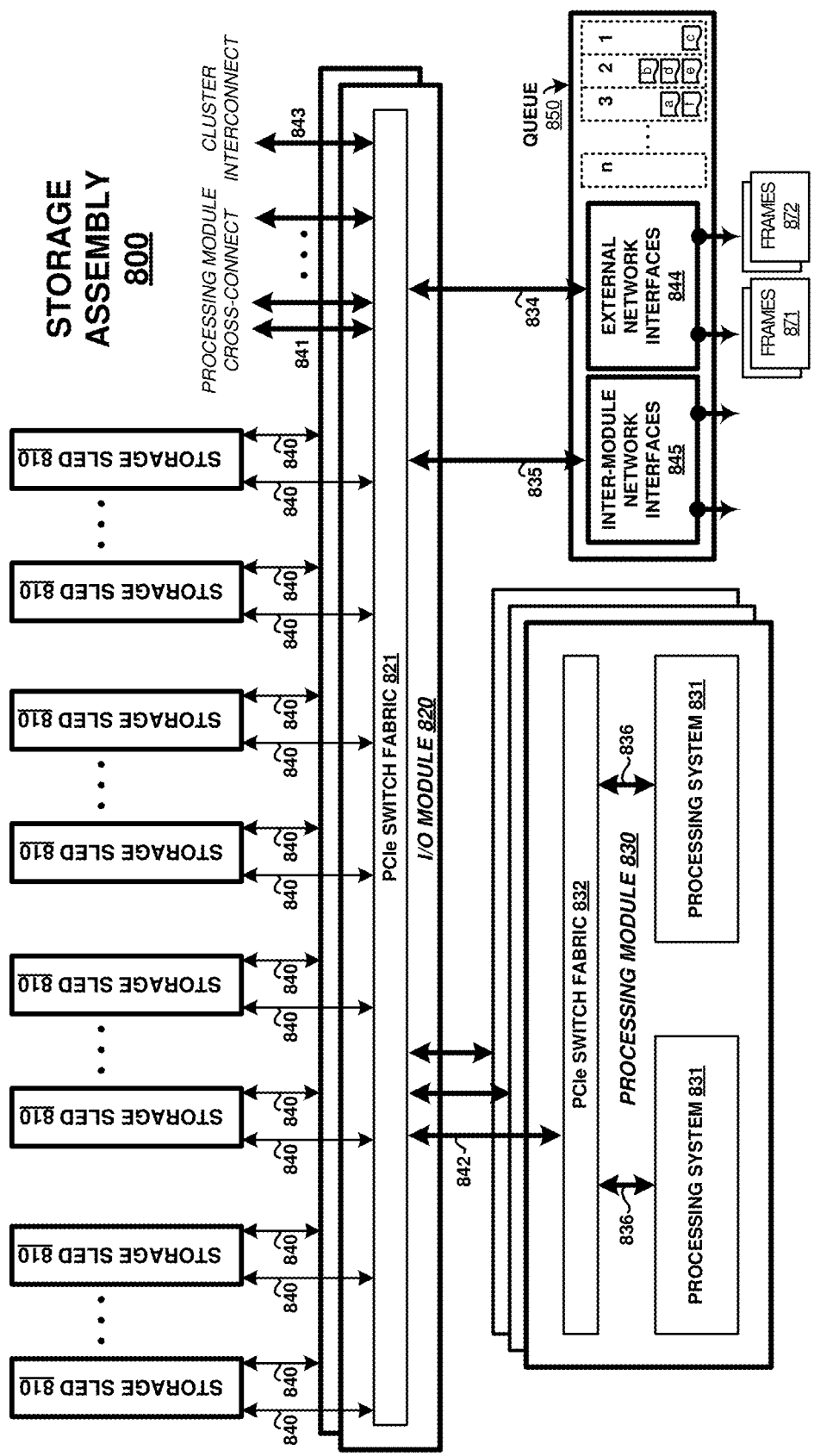
FIG. 8 is a system diagram illustrating a storage assembly.

FIG. 3 is a block diagram illustrating processing module 300, as an example of processing modules 430 or 530 of FIG. 4, processing systems 610 or 620 of FIG. 5, or processing modules 830 of FIG. 8. Processing module 300 includes two or more processing systems 310, at least one PCIe switch 332, PCIe switches 340, external network interfaces 334, inter-module network interfaces 335, power control module 331, and holdup circuit 336. Power control module 331 distributes power to each element of processing module 300 over associated power links 337-339. Power control module 331 can selectively enable/disable power for each power link. Further communication links can be included for intra-sled communication between the various elements of processing module 300.

Each processing system 310 further includes processor 311 and storage system 312. In some examples, network interfaces 334-335 are included in processing system 310, but network interfaces 334-335, or portions thereof, can be provided by separate circuitry and elements, such as separate PCIe expansion cards. Each processor can communicate over an associated Ethernet sideband signaling link 356, such as with various microprocessors/controllers or power control nodes on other sleds or with I/O modules to retrieve statistical data or usage information. Links 356 can comprise Ethernet interfaces, or can comprise SMBus, JTAG, I2C, CAN, or any other communication interfaces, and in some examples is provided over separate links. Links 356 can be provided using external network interfaces, such as network interface cards or adapters communicatively coupled over ones of PCIe links 343. Each processor 311 also includes at least one PCIe interface, such as a PCIe transceiver and communication circuitry for communicating over associated PCIe links 333 and 341. The PCIe interface of each processor 311 can include a large number of PCIe lanes which are subdivided between narrower PCIe links, such as a ×16 interface that is subdivided among two ×8 links. In some examples, the PCIe interfaces are integrated into a single-chip die of processor 311. In other examples, the PCIe interface is provided over a separate microchip transceiver which can communicate with an associated processor 311 over another communication interface, such as a front-side bus of processor 311 or peripheral hub chip interface.

Processor 311 can comprise one or more microprocessors and other processing circuitry that retrieves and executes software 313 from storage system 312. Processor 311 can be implemented within a single processing device but can also be distributed across multiple processing devices or subsystems that cooperate in executing program instructions. Examples of processor 311 include general purpose central processing units, application specific processors, and logic devices, as well as any other type of processing device, combinations, or variations thereof. In some examples, processor 311 comprises an Intel or AMD microprocessor, ARM microprocessor, FPGA, ASIC, application specific processor, or other microprocessor or processing elements.

Storage system 312 can comprise any non-transitory computer readable storage media capable of storing software 313 that is executable by processor 311. Storage system 312 can include volatile and nonvolatile, removable and non-removable media implemented in any method or technology for storage of information, such as computer readable instructions, data structures, program modules, or other data. Storage system 312 can be implemented as a single storage device but can also be implemented across multiple storage devices or sub-systems co-located or distributed relative to each other. Storage system 312 can comprise additional elements, such as a controller, capable of communicating with processor 311. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof.

Software 313 can be implemented in program instructions and among other functions can, when executed by processing system 310 in general or processor 311 in particular, direct processor 311 to operate as commanded by software 313. Software 313 can include processes, programs, or components, such as operating system software, database software, or application software. Software 313 can also comprise firmware or some other form of machine-readable processing instructions executable by elements of processing system 310, such as processor 311. Encoding software 313 on storage system 312 can transform the physical structure of storage system 312. The specific transformation of the physical structure can depend on various factors in different implementations of this description. Examples of such factors can include, but are not limited to the technology used to implement the storage media of storage system 312 and whether the computer-storage media are characterized as primary or secondary storage. For example, if the computer-storage media are implemented as semiconductor-based memory, software 313 can transform the physical state of the semiconductor memory when the program is encoded therein. For example, software 313 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Processing module 300 also interfaces with one or more network interfaces 334 to communicate over one or more packet network links 354, and interfaces with one or more network interfaces 335 to communicate over one or more packet network links 355. One or more network interfaces 334-335 are communicatively coupled to an associated processing system 310 or processor 311 via PCIe links 343 in FIG. 3. External access by end users or end user devices to processing module 300, and the storage sleds managed thereby, can be provided over ones of packet network links 354. Inter-module communications between processing module 300 and other processing modules of a storage assembly or in other storage assemblies can be provided over ones of packet network links 355. In this example, each of packet network links 354-355 can each comprise Ethernet links, Transmission Control Protocol/Internet Protocol (TCP/IP) links, although other packet link types can be employed. Links 354 can employ packet communications for carrying iSCSI traffic or NVMe links carrying NVMe traffic. Network interfaces 334-335 can include Ethernet interfaces, IP interfaces, T1 interfaces, or other local or wide area network communication interfaces which can communicate over a communication link. Examples of communication transceivers include network interface card equipment, receivers, transmitters, modems, and other communication circuitry.

PCIe switch 332 handles back end data plane traffic for processing module 300 for storage and retrieval of data. PCIe switch 332 communicates with storage sleds through one or more I/O modules (not pictured) over PCIe links 352, and with ones of processors 311 over PCIe links 333. Each of links 352 and 333 comprises a PCIe link with eight lanes, namely a "×8" PCIe link. PCIe switch 332 comprises a PCIe cross connect switch for establishing switched connections between any PCIe interface handled by PCIe switch 332. In some examples, PCIe switch 332 comprises a PLX Technology PEX8796 24-port, 96 lane PCIe switch chip.

PCIe switches 340 handle front end data plane traffic for processing module 300 for communications between processors of different processing modules as well as with network interfaces. PCIe switches 340 communicate with other processing modules through one or more I/O modules (not pictured) over PCIe links 342, and with ones of processors 311 over PCIe links 341. Each of links 342 and 341 comprises a PCIe link with eight lanes, namely a "×8" PCIe link. PCIe switches 340 also includes external module links 343, which in this example are four ×8 PCIe links. PCIe switches 340 comprise a PCIe cross connect switch for establishing switched connections between any PCIe interface handled by PCIe switches 340. In some examples, PCIe switches 340 each comprise a PLX Technology PEX8796 24-port, 96 lane PCIe switch chip.

Power control module 331 includes circuitry to selectively provide power to any of the elements of processing module 300. Power control module 331 can receive control instructions from a processor 311 over associated links 337-339 or additional communication links. Power control module 331 can receive power over power link 357 as a power source for the various elements of processing module 300. Holdup circuit 336 includes energy storage devices for storing power received over power link 357 for use during power interruption events, such as loss of source power. Holdup circuit 336 can include capacitance storage devices, such as an array of capacitors.

FIG. 4 is a system diagram illustrating storage assembly 400 and storage assembly 500. Storage assembly 400 includes storage sleds 410 and 415, I/O modules 420 and 425, processing module 430, network module 440, and Ethernet module 441. Storage sled 410 includes SSD drives 411 and PCIe switch 412. Storage sled 415 includes SSD drives 416 and PCIe switch 417. Although two storage sleds are included in storage assembly 400, it should be understood that any number of storage sleds can be included. Also, although four SSD drives are included in each storage sled, it should be understood that any number of SSD drives can be included. I/O module 420 includes PCIe switch 421, and I/O module 425 includes PCIe switch 426. Although one PCIe switch is shown for each I/O module in storage assembly 400, it should be understood that any number can be included. Processing module 430 includes processors 431A and 431B and PCIe switches 433-434, and further elements can be included as discussed above.

Storage assembly 500 includes storage sleds 510 and 515, I/O modules 520 and 525, processing module 530, network module 540, and Ethernet module 541. Storage sled 510 includes SSD drives 511 and PCIe switch 512. Storage sled 515 includes SSD drives 516 and PCIe switch 517. Although two storage sleds are included in storage assembly 500, it should be understood that any number of storage sleds can be included. Also, although four SSD drives are included in each storage sled, it should be understood that any number of SSD drives can be included. I/O module 520 includes PCIe switch 521, and I/O module 525 includes PCIe switch 526. Although one PCIe switch is shown for each I/O module in storage assembly 500, it should be understood that any number can be included. Processing module 530 includes processors 531A and 531B and PCIe switches 533-534, and further elements can be included as discussed above.

Interface modules 440 and 540 each communicate over various interfaces, namely associated network interfaces 442 or 542 for TCP/IP, iSCSI, or NVMe traffic, and an associated processing module PCIe interface 456/556. Interface modules 441 and 541 each communicate over an Ethernet network 443, which can employ one or more tunneled connections, such as tunnel 444.

Processing module 430 communicates with storage sleds 410 and 415 over PCIe links 454 and 455 which are switched through associated PCIe switches on associated I/O modules. Storage sled 410 communicates with different I/O modules over respective PCIe links 450-451. Storage sled 415 communicates with different I/O modules over respective PCIe links 452-453. Processing module 530 communicates with storage sleds 510 and 515 over PCIe links 554 and 555 which are switched through associated PCIe switches on associated I/O modules. Storage sled 510 communicates with different I/O modules over respective PCIe links 550-551. Storage sled 515 communicates with different I/O modules over respective PCIe links 552-553. The elements of FIG. 4 form a storage system with multiple redundant PCIe links and Ethernet links between processing modules and storage sleds by way of I/O modules, such as those discussed herein.

In operation, a specific processor of a processing module will be configured to manage or "own" specific SSD drives on various storage sleds. For example, processor 431A can be configured to manage SSD drives 411 of storage sled 410 while processor 431B can be configured to manage SSD drives 416 of storage sled 415 Likewise, processor 531A can be configured to manage SSD drives 511 of storage sled 510 while processor 531B can be configured to manage SSD drives 516 of storage sled 515. Other combinations can be used, including a subset of SSD drives of a particular storage sled managed by a processor and the remaining SSD drives of that particular storage sled managed by another processor. Managing an SSD drive comprises a processor initializing the SSD drive and handling read, write, or other file or object transactions for the SSD drive. Each processor can reference a data structure stored on a non-transitory computer readable medium to determine which SSD drives are to be managed as well as which other processor or storage assembly manages drives that are not currently managed by a particular processor.

In some examples, a particular processor has been configured to manage a particular set of SSD drives, and that processor might experience a failure or interruption in normal operation. Responsive to the failure of a processor, such as processor 431A, another processor 431B can be configured to take over management of the SSD drives previously managed by the failed processor 431A. To take over management of the SSD drives previously managed by the failed processor 431A, processor 431B can initialize the SSD drives previously managed by the failed processor 431A and begin managing file operations, such as read and write operations, for those SSD drives. Processor 431B can include a failover table or data structure which indicates SSD drives for which processor 431B manages in the event of a failure of another processor. The failover table can also indicate a processor or processors that processor 431B monitors to determine if any failures have occurred. Similar operations can occur for processors 531A and 531B failing over to each other. In some examples, a processor in storage assembly 400 can failover to a processor in storage assembly 500.

However, during normal operations, any processor in any storage assembly in FIG. 4 might receive a storage operation for SSD drives managed by a storage system that includes both storage assembly 400 and storage assembly 500. These storage operations might be received over network module 440 or network module 540, such as iSCSI storage operations or NVMe storage operations. Load balancing between storage assemblies or processors within storage assemblies can be established to that network interfaces of a particular storage assembly can receive storage operations for SSD drives managed by that particular storage assembly or storage operations for SSD drives managed by another storage assembly. This load balancing can enhance operation over a network by allowing many different network interfaces to receive storage operations in parallel. A single logical unit can be created that spans more than one processor or storage assembly so that end user devices can exchange storage operations and associated data over any network interface presented by the storage assemblies. In one example, an iSCSI LUN is established that spans multiple storage assemblies or processors which can span SSD drives managed by elements of different storage assemblies and different network interfaces. Once a storage operation that is received by a first processor in a first storage assembly is identified as being for SSD drives managed by another processor (possibly in a second storage assembly)

then that first processor can transfer the storage operation for handling by the other processor. In the specific examples herein, a PCIe interconnect can be used to transfer the storage operation, or a tunneled network connection can be employed, among other interfaces and connections.

As a specific example, storage operation 460 is received over packet link 442 by network module 440. Network module 440 receives storage operation 460 in one or more packets received over link 442, such iSCSI packets or NVMe frames, which can be transported using TCP/IP protocols. Network module 440 transfers storage operation 460 over PCIe switch 434 (and associated PCIe links 456 and 436) to processor 431B. It should be understood that processor 431A might instead receive storage operation 460. Once storage operation 460 is received by processor 431B, packet analysis and routing process 471 is initiated in software 470. Process 471 uses routing table 472 and memory map 473 to identify a destination for storage operation 460.

In a first example, processor 431B determines that it handles SSD drives associated with storage operation 460, such as SSD drives 416 which are used in a read or write operation identified by storage operation 460. In this first example, processor 431B handles a read or write operation for storage operation 460 with storage sled 415 over PCIe switch 433 and a selected one of PCIe switch 421 or 426. Before the storage operation is handled by processor 431B, the storage operation is queued for later handling, such as when many storage operations are received in a short amount of time or in parallel by processor 431B. QoS handler 473 identifies a priority designation for storage operation 460 and places storage operation 460 into an appropriate queue managed by processor 431B according to the priority designation. This priority designation can include those determined for different LUNs handled by processor 431B or for different users, client network addresses, applications, or other designations. Once storage operation 460 has been queued in an associated priority queue, processor 431B eventually handles a read or write operation indicated by storage operation 460 according to the priority established for storage operation 460 in the queue.

In a second example, processor 431B determines that another processor handles SSD drives associated with storage operation 460, such as SSD drives included in storage assembly 500. Processor 431B can then determine a pathway over which to transfer storage operation 460 to storage assembly 500. A first pathway in this second example is a PCIe fabric formed between storage assemblies using PCIe switch 432 and PCIe switch 539 and an accompanying cable and connector hardware. Storage packets 461 are transferred over this PCIe fabric to transfer storage operation 460 from processor 431B for receipt by processor 531A. A second pathway in this second example is Ethernet tunnel 444 formed between storage assemblies using Ethernet module 441, Ethernet module 541, and Ethernet link 443. Storage packets 462 are transferred over this Ethernet tunnel to transfer storage operation 460 from processor 431B for receipt by processor 531A. Communications for Ethernet tunnel 444 also are carried over PCIe switch 434 from processor 431B and PCIe switch 534 to processor 531A.

Furthermore, in addition to transferring storage operation from one processor to another processor, which may be in another storage assembly, the storage operation is transferred from a layer 2 buffer associated with the first processor (i.e. processor 431B) into a layer 2 buffer associated with the second processor (i.e. processor 531A). Each of processor 431B and 531A can have an associated queuing structure for buffering storage operations according to a quality of service or priority associated with each storage operation, as discussed herein. These layer 2 buffers can include these quality of service differentiations, such as included in FIG. 5.

To further illustrate this layer 2 buffer handling for transfer of storage operations, FIG. 5 is presented. FIG. 5 illustrates storage system 600 that receives storage operations from end user devices over an iSCSI protocol, as received in packets 601. In alternative examples, an NVMe protocol is employed instead of, or in addition to, an iSCSI protocol.

In FIG. 5, several "nexus" arrangements are established which segregate iSCSI transactions based on at least an iSCSI target identifier, iSCSI logical unit (LUN), and iSCSI client identifier. Other factors can be used to establish each nexus arrangement, such as end user IP addresses, end user Ethernet MAC addresses, physical location, user identities, application identity, data type (e.g. video, audio, web traffic, database data), virtual private network (VPN) identifiers, among other factors, including variations and combinations. The nexus arrangement allows particular transactions to be identified as being associated with a particular process, application, or end user data process which is used in FIG. 5 to establish different priorities or qualities of service for each nexus. The iSCSI client identifier can indicate an end user iSCSI initiator or an end user application, such as a data application employed to access system 600 from an end user device or system. The iSCSI target and iSCSI LUN can be used to identify logical storage partitions established in system 600, such as across one or more SSD storage drives handled by a particular processing system.

Storage system 600 includes processing system 610, processing system 620, and Ethernet tunnel 630. Further storage system elements such as found in the previous figures can be included in system 600, but are omitted for clarity in FIG. 5. Processing system 610 can be an example of processing module 430 in FIG. 4, although variations are possible Likewise, processing system 620 can be an example of processing module 530 in FIG. 4, although variations are possible. Also, processing module 300 of FIG. 3 or processing module 830 of FIG. 8 can be employed as any of processing systems 610 and 620.

Processing system 610 and processing system 620 are communicatively coupled by at least an Ethernet network which carries Ethernet tunnel 630 over a private Ethernet connection. Ethernet tunnel 630 can be established between one or more network interfaces associated with each processing system, and can further include any number of packet networks, switches, routers, and other network elements. In some examples, Ethernet tunnel 630 is established over the same network interfaces that receive packets 601, while in other examples separate network interface elements are employed. For example, Ethernet tunnel 630 might be established over network module 440 and network module 540 of FIG. 4, or over Ethernet module 441 and Ethernet module 541 of FIG. 4. In further examples, Ethernet tunnel 630 is established over a front-end control plane such as Ethernet sideband signaling 356 in FIG. 3. Instead of Ethernet signaling or interfaces for tunnel 630, other storage-oriented interfaces might be employed such as Fiber-Channel, Infiniband, Universal Serial Bus, or other wired, optical, or wireless data interfaces.

In operation, packets are received by processing system 610 or processing system 620. These packets can be received by a network interface card associated with the processing system, such as over an Ethernet interface. The packets are associated with a storage operation, such as a write transaction or read transaction, for data storage on an associated storage drive, such as a storage sled or SSD as discussed herein. Each of processing systems 610 and 620 include network interfaces that can receive storage operations for each other for redundancy, load balancing, failover protection, among other features. Additionally, as discussed above, each processing system manages or owns storage drives that are particular to each processing system. Specifically, processing system 610 will manage a first set of storage drives, while processing system 620 will manage a different second set of storage drives. However, if an iSCSI storage operation for the second set of storage drives is received over a network interface associated with a processing system that manages the first set of storage drives, then the operations detailed in FIG. 5 can be followed.

In FIG. 5, packets 601 are associated with a storage operation for storage drives managed by processing system 610, and packets 602 are associated with storage operations for storage drives managed by processing system 620. However, packets 602 might be received by processing system 610 which manages a different set of storage drives not associated with packets 602. These packets will be received into the various network stack layers of a network interface of processing system 610, such as PHY layer 1 611, and ETH layer 2 612. If the packets are for a storage drive managed by another processing system, such as processing system 620, then the process detailed below can allow for processing system 610 to transfer the packets to processing system 620.

If the packets are for a storage drive managed by processing system 610, then these packets can be handled by processing system 610 according to a tiered buffer 612B that segregates incoming storage operations according to a QoS associated with the particular nexus identified for the packets. Once the packets are serviced from tiered buffer 612B, then the packets proceed into a further processing layer, such as into IP layer 3 613 or further layers 614-616 for storage as data 681.

Processing system 610 has a tiered buffering system in local buffer 618. Packets 601 are inspected by processing system 610 to identify a nexus associated therewith. This nexus determines which level of priority is given to packets 601 for handling by processing system 610. When many storage operations are being handled concurrently by processing system 610, it is advantageous to prioritize the storage operations of one particular nexus over another. The tiered layering of buffer 612B in local buffer 618 can establish several QoS handling priorities, which in FIG. 5 is shown as 3 different QoS levels, although a different number of QoS levels can be employed. In this example, as shown by nexus priority table 619, nexus A which is associated with packets 601 has a QoS level of '3' and thus packets 601 are prioritized within local buffer 618 as QoS level 3. Although local buffer 618 shows the QoS priorities as segregated within local buffer 618, these QoS priorities can be established by various techniques. In a first example, the QoS priorities are established as all within a single buffer data structure with each storage operation having a tag or flag which indicates the associated QoS that has been assigned to the storage operations. In a second example, the QoS priorities are established each in separate buffer data structures, and each buffer data structure is serviced according to the associated QoS. Other buffering and servicing processes can be employed which still maintain the various QoS priorities for received storage operations on a per-nexus or per-LUN basis.

In specific examples, once packets 601 and 602 are received into buffer 612B, processing system 610 executes a process to determine if packets 601 and 602 are related to a storage operation for storage drives managed by processing system 610 or by another processing system. This process includes checking various headers and field values of packets 601 and 602 to determine which packets are associated with storage drives that processing system 610 manages or another processing system. An iSCSI target identifier and a logical block address (LBA) associated with the iSCSI target identifier can be determined from packets 601 and 602. This target identifier and logical block address can be used to determine if the associated storage operation comprising the packets is for the local processor/processing system 610 or a remote processor/processing system 620, among other processors/processing systems. In some examples, the nexus identification scheme is employed, where a combination of properties of the associated packets are examined to identify a nexus and the packets are routed to particular processing system based on a memory map of the storage space as correlated to nexuses.

In addition to having tiered buffering or buffering based on service levels mentioned above, system 600 can pre-allocate buffering resources on a QoS basis or on a per-nexus basis before packets are received for handling by processing system 610 or 620. For example, portions of local buffer 618 can be spawned or pre-allocated by processing system 610 when a new nexus or LUN is established by an end user device. The pre-allocation can be performed for only certain QoS levels, such as high-priority LUNs or nexuses. In a specific example, a nexus assigned a QoS of 1 can have buffer resources allocated by processing system 610 responsive to establishment of the nexus, but before any storage operations or packets associated with that nexus are received by processing system 610. The pre-allocation allows resources to be ready prior to receipt of traffic for a particular nexus or LUN, preventing any denials or rejections of the traffic by a processor or processing system which becomes too overloaded to handle allocation of buffer space upon receipt of the traffic. These denials would be propagated back to the originating system, such as an end user system, and create slowdowns related to retransmissions among other issues. It should be understood that the pre-allocation can occur in any of the processing systems or buffer structures of system 600.

As a further description, each packet (or frame) received by processing system 610 is inspected in Ethernet layer 2 (612). Properties of the packets are inspected to identify a nexus of the packets which is used to reference layer 2 routing tables stored in processing system 610, such as table 690 in FIG. 6 or routing table 472 in FIG. 4. These routing tables indicate which processing system (or processing node) can service the incoming/inspected storage operation indicated by packets 601 and 602 (i.e. either the local processing system 610 or a remote processing system 620). When packets 601 or 602 are to be transferred to remote processing system 620, the packets can be encapsulated inside of another packet or packets, and passed over Ethernet tunnel 630. In other examples, the same packets received can be transferred over Ethernet tunnel 630. In a specific example, remote processing system 620 receives packets 602 which indicate a packet type used to specify a "tunneled" storage I/O request, decodes packets 602, and then places packets 602 into buffer 622B.

In addition to providing different priority or service levels for buffers of a particular processing system, routing buffer 617 can also have similar priorities or service levels established for traffic that is routed between processing systems over PCIe switch fabric 631. Higher priority or higher QoS traffic associated with particular nexus or LUN properties can be transferred ahead of or serviced faster than lower priority or lower QoS traffic. Additionally, the individual PCIe switches or switch circuitry that comprise PCIe switch fabric, such as the PLX switches mentioned herein, can have hardware-based QoS features which allow for prioritization of traffic handled over PCIe switch fabric 631. This QoS can comprise prioritization of routing and buffering of packets, storage operations, or other traffic as discussed for buffers 618 and 628. The QoS can be configured using configuration ports or configuration interfaces of the associated PLX switches or other hardware elements to establish one or more tiers of service levels for traffic based on a nexus, LUN, or other discriminating factor.

It should be noted that the same memory addresses can be used in the Ethernet tunnel examples discussed herein as with PCIe fabric examples. However, instead of a PCI DMA mechanism used in the PCIe example, a local Ethernet driver places packets 602 into buffer 622B. An Ethernet driver of remote processing system 620 detects the arrival/appearance of this routed storage operation (packets 602) and processes packets 602, thus removing packets 602 from the local memory queue of the Ethernet driver and spoofing the network/IP stack just as if packets 602 had moved through the fabric after being received over an external network interface of processing system 620.

As with processing system 610, processing system 620 has a tiered buffering system in local buffer 628. Packets 602 are inspected by processing system 620 to identify a nexus associated therewith. This nexus determines which level of priority is given to packets 602 for handling by processing system 620. When many storage operations are being handled concurrently by processing system 620, it is advantageous to prioritize the storage operations of one particular nexus over another. The tiered layering of buffer 622B in local buffer 628 can establish several QoS handling priorities, which in FIG. 5 is shown as 3 different QoS levels, although a different number of QoS levels can be employed. In this example, as shown by nexus priority table 629, nexus B which is associated with packets 602 has a QoS level of '1' and thus packets 602 are prioritized within local buffer 628 as QoS level 1. Although local buffer 628 shows the QoS priorities as segregated within local buffer 628, these QoS priorities can be established by various techniques. In a first example, the QoS priorities are established as all within a single buffer data structure with each storage operation having a tag or flag which indicates the associated QoS that has been assigned to the storage operations. In a second example, the QoS priorities are established each in separate buffer data structures, and each buffer data structure is serviced according to the associated QoS. Other buffering and servicing processes can be employed which still maintain the various QoS priorities for received storage operations on a per-nexus or per-LUN basis.

Once packets 602 are in local buffer 628 and the associated QoS level indicates that packets 602 are to be serviced presently, then packets 602 then get further processed by processing system 620. Specifically, packets 602 are processed up the network stack of processing system 620, eventually by iSCSI 625 layer and an associated filesystem. A completion indication is generated after the associated storage operation is processed (i.e. a read or write operation). Processing system 620 can pass the completion indication back to processing system 610 using one or more packets tunneled over Ethernet tunnel 630. In other examples, once packets 602 are buffered in buffer 622B then processing system 620 can indicate a completion indication to processing system 610. In yet other examples, the completion indication is omitted.

A processing node can be correlated to a PCIe address range, with each processing system or processor in a storage system that shares a PCIe address space having a corresponding address range. If the address range is for itself (local processing system 610), then processing system 610 determines that it should handle packets 601 or 602 through layers 613-616 and storage of corresponding data 681. If the address range is for a remote processing system, such as processing system 620, then processing system 610 determines that it should transfer packets 601 or 602 to the remote processing system.

If storage packets are to be handed by another processing system, such as determined using a routing table, then processing system 610 transfers the packets from buffer 612B to the PCIe memory address location indicated by table 670 as the processing node ID over Ethernet tunnel 630. FIG. 5 shows processing system 610 transferring packets 602 over Ethernet tunnel 630 into a buffer of processing system 620, namely buffer 622B. Processing system 610 can also issue an interrupt or other signal to processing system 620 which indicates that packets 602 are waiting in buffer 622B for handling by processing system 620.

Processing system 620 checks buffer 622B responsive to an interrupt issued by processing system 610, or due to periodic polling of buffer 622B. This buffer 622B can be a buffer maintained by ETH layer 2 622 of processing system 620. ETH layer 2 622 can have more than one buffer associated therewith. A first buffer can be a circular buffer used for receiving packets over PHY layer 1 621, such as routing buffer 627. A second buffer can be a PCIe or layer 2 buffer, such as local buffer 628 of buffer 622B, that accepts packets from other processing systems over a PCIe fabric or Ethernet tunnel.

In this example, buffer 622B is associated with ETH layer 2 622 of a network stack of processing system 620. Processing system 620 then processes packets 602 as if processing system 620 itself had received packets 602 over its own network interface, such as by passing packets 602 to a higher layer in the network stack, including IP layer 3 623. These packets can then be handled by processing system 620 for the particular storage operation that are indicated by packets 602 and the associated QoS level. For example, if packets 602 describe a write operation for SSDs managed by processing system 620, then data 682 is transferred for storage in associated storage drives by processing system 620.

Since packets 602 were originally addressed to processing system 610, portions of packets 602 can be transformed by processing system 610 to be handled by a network stack of processing system 620. The recipient peer/remote node, namely processing system 610, receives packets 602 and transforms portions of packets 602, such as TCP frames, and re-builds the Ethernet header, the IP header as packets 602 to appear as if it was sent directly to processing system 620 to prevent a network stack of processing system 620 from rejecting packets 602. This transformation can include modifying an associated MAC addresses of packets 602, Ethernet CRC value, destination IP address, and other header properties. In other examples, processing system 610 does not transform the portions of packets 602 an instead processing system 620 inhibits rejection of packets 602 due to MAC address, Ethernet CRC value, or destination IP address mismatches.

In this manner, processing system 610 can receive packets for storage operations for storage drives handled by another processing system 620. Processing system 610 inspects packets 601 and 602 and determines to transfer packets 602 over Ethernet tunnel 630 to the correct processing system. Moreover, the packets are transferred into a layer 2 buffer of the correct processing system and the correct processing system handles the packets as if it had originally received the packets instead of the processing system that instead received the packets over a different network interface.

In specific examples, network driver software of a second processing system is modified to intake packets received at a first processing system as if it was received at that second processing system. Likewise, the driver software of the first processing system is also modified to transfer packets received by the first processing system for delivery into a network stack of the second processing system. The layer 2 driver software of the second processing system can receive an interrupt generated by the first processing system to indicate that new packets are waiting in an associated layer 2 buffer of the second processing system.

FIG. 5 also includes further example elements of processing system 610, namely processing circuitry 641, random access memory (RAM) 642, storage 643, and communication interface 640, although further elements can be included. Similar elements can also be included in processing system 620. Processing circuitry 641 can be implemented within a single processing device but can also be distributed across multiple processing devices or sub-systems that cooperate in executing program instructions. Examples of processing circuitry 641 include general purpose central processing units, microprocessors, application specific processors, and logic devices, as well as any other type of processing device.

Communication interface 640 includes one or more communication and network interfaces for communicating over communication links, networks, such as Ethernet, packet networks, the Internet, and the like. The communication interfaces can also include PCIe links, serial links, such as SPI links, I2C links, USB links, UART links, or one or more local or wide area network communication interfaces which can communicate over Ethernet or Internet protocol (IP) links. Communication interface 640 can include network interfaces configured to communicate using one or more network addresses, which can be associated with different network links. Examples of communication interface 640 include network interface card equipment, transceivers, modems, and other communication circuitry. In FIG. 5, Communication interface 640 also can include layers of the network stack featured here, such as layers 611-616.

RAM 642 and storage 643 together can comprise a non-transitory data storage system, although variations are possible. RAM 642 and storage 643 can each comprise any storage media readable by processing circuitry 641 and capable of storing software. RAM 642 can include volatile and nonvolatile, removable and non-removable media implemented in any method or technology for storage of information, such as computer readable instructions, data structures, program modules, or other data. Storage 643 can include non-volatile storage media, such as solid state storage media, flash memory, phase change memory, or magnetic memory, including combinations thereof. RAM 642 and storage 643 can each be implemented as a single storage device but can also be implemented across multiple storage devices or sub-systems. RAM 642 and storage 643 can each comprise additional elements, such as controllers, capable of communicating with processing circuitry 641.

Software stored on or in RAM 642 and storage 643 can comprise computer program instructions, firmware, or some other form of machine-readable processing instructions having processes that when executed a processing system direct processing system 610 to operate as described herein. For example, software can drive control system 610 to handle data frames directed to one or more applications received over one or more network interfaces, establish a plurality of data buffers individually associated with application threads of the one or more applications, store associated ones of the data frames for the application threads in the data buffers as the data frames are processed through a network stack of the networked data processing system, and establish priority levels for servicing storage operations from the plurality of data buffers and individually associate the priority levels with nexus arrangements, among other operations. The software can also include user software applications. The software can be implemented as a single application or as multiple applications. In general, the software can, when loaded into a processing system and executed, transform the processing system from a general-purpose device into a special-purpose device customized as described herein.

Figure 6:
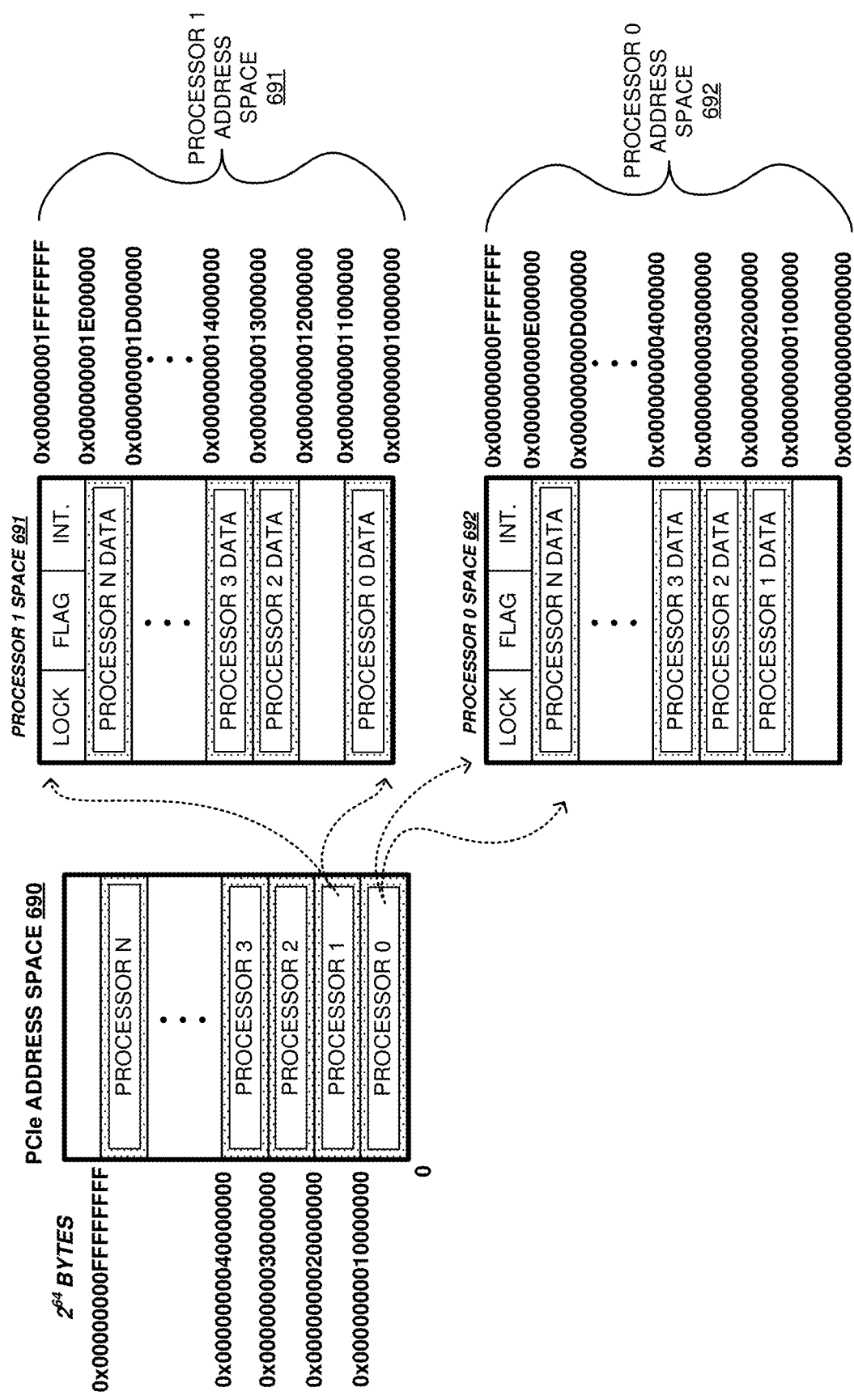
FIG. 6 is s diagram illustrating a memory allocation table.

FIG. 6 is s diagram illustrating PCIe address space 690, which can be employed for processing modules as discussed herein. PCIe address space 690 is a $2^{64}$ bit address space associated with the PCIe address space of a front end PCIe switch fabric of a storage system. PCIe address space 690 maps various ranges to buffers of particular processors or processing systems. Specifically, an address range is associated with a processing system, such as processing system 1 through N, among others. In a storage system, such that described in the included Figures, a particular processor will manage and instantiate a particular subset of the total number of storage drives, but storage operations can be received into any processor over an associated network interface. To enable load balancing and redundancy, each processor or processing system can include an associated network interface that can receive packets for storage operations, including read and write transactions. If the packets received at a first processor are for storage drives not managed by the first processor, then these packets are transferred for handling by another processor.

To facilitate the transfer of the packets and associated data from one processor to another processor, PCIe address space 690 is subdivided among the various processing systems. Each processing system in a storage system is assigned a particular quantity of storage drives, and thus is configured to intake packets and data addressed to a particular PCIe address range. A first processor transferring packets for delivery to another processor does not need to have knowledge of which exact processor is configured to handle the storage drives for the packets. Instead, the storage space of the entire storage system is divided among the various processors in the storage system, and each individual processor is configured to respond to only transactions directed to a specific address range of the PCIe address space. Thus, a storage system, such as storage system 100 in FIG. 1, can have a total storage space of $2^{64}$ bytes, or 16 exbibytes of byte-addressable memory.

When a first processor receives data packets for a storage operation, such as a read or write operation, the first processor determines if the storage address included in the data packets is for an address range managed by the first processor. If the data packets indicate a storage address managed by the first processor, then the first processor handles the storage operation, such as by transferring write data for storage in storage drives managed by the first processor or by initiating a read operation for storage drives managed by the first processor. If the data packets indicate a storage address managed by the second processor, then the first processor merely transfers the data packets to the address by the mapping to PCIe address space 690. The particular processor configured to handle storage operations for those storage addresses indicated in the data packets will be configured to receive any data transferred to the associated PCIe address range, and responsively handle the storage operation for the storage drives managed by that particular processor. The first processor does not need to know which particular processor manages particular storage drives, and instead merely transfers the data packets for a storage operation to a particular PCIe address which is automatically handled by the correct processor. From the viewpoint of the processor which receives the packets, the PCIe address space includes address ranges that it manages and address ranges it does not manage.

Moreover, each processor can have its address space sub-divided into buffer spaces for the other processors of the system. For example, processor 1 might have a first address range, but when processor 2 transfers data to processor 1, processor 2 uses its own identity as a hash into the address space of processor 1. In this manner, each processor's address space is segregated into sub-spaces that are each associated with another processor in the storage system.

As a specific example, FIG. 6 is presented. FIG. 6 includes PCIe address space 690. PCIe address space 690 is subdivided among the total number of processors in a storage system, such as in storage system 100 of FIG. 1. For example, if a storage system has 12 processors, then PCIe address space 690 can be subdivided among the 12 processors. Other configurations are possible. PCIe address space 690 can be equally subdivided, unequally subdivided, or a portion of PCIe address space 690 can be subdivided, among other configurations. The total amount of PCIe address space utilized by a storage system can correspond to the total addressable storage space provided by the collection of storage drives employed. For example, if 2 terabytes of storage space is employed, then PCIe address space 690 can have a maximum range corresponding to the 2 terabytes of storage space and each processor can have a corresponding sub-portion of that 2 terabytes of storage space allocated thereto. In yet other examples, the total amount of PCIe address space might not correspond to the total storage space of the storage system, and might be a smaller amount and used just for shuttling storage packets among the various processors for load balancing and failover fault handling. Of course, the load balancing and failover features can be employed in the example where PCIe address space 690 is correlated to the total addressable storage space of the storage system.

For each processor address space in PCIe address space 690, a further subdivision is performed. Specifically, processor 0 and processor 1 address spaces 691-692 are shown in FIG. 6. Processor 0 address space 691 includes portions assigned to each other processor in a storage system, namely processor 1-N. Additionally, processor 0 address space 691 includes a miscellaneous area that includes space for lock indicators, flags, and interrupts. These interrupts can be used to signal a receiving processor that data or packets are ready for handling. The lock and flag spaces can be used for handshaking, semaphoring, or other uses during data or packet transfer between processors.

In operation, if processor 0 desires to transfer packets to processor 1, then processor 0 will transfer the packets into the space allocated for processor 0 within address space 691 of processor 1. These packets can be transferred over an associated PCIe fabric or Ethernet tunnel as described herein. Any appropriate interrupt or flags can be set by processor 0 in the interrupt/flag/lock space of processor 1 address space 691. Processor 1 can detect that packets or other data is waiting in the address space for processor 0 and act accordingly, such as by initiating a storage operation indicated by the packets transferred by processor 0 into the address space of processor 1.

As discussed herein, each processor of a storage system is configured to have visibility to all storage drives of a particular storage system, such as by using the memory mapped address spaces in FIG. 6. However, each processor does not manage all storage drives of a particular storage system, and instead only manages a subset of the total storage drives. A PCIe fabric or Ethernet tunnel scheme is employed to exchange data and packets between processors and maintain visibility for each processor to each storage drive. A PCIe back end data plane is employed to transfer data to and from actual storage drives and the various managing processors. One or more PCIe switches form the PCIe back end data plane. An initialization process is performed for each processor of a storage system to allow each processor to manage the particular subset of the storage drives. Typically for a processor that manages storage drives, the processor performs a PCIe discovery process to find the storage drives connected via PCIe interfaces to the processor to initialize or enumerate those storage drives. In some examples, for storage drives not managed by a processor, initialization software spoofs the enumeration process for that processor so that processor thinks that the PCIe discovery process has found all storage drives in the storage system.

For example, a first processor, upon boot up or responsive to a reconfiguration process, performs a scan of any associated PCIe interfaces for devices that the first processor is to manage and enumerate. However, in a storage system such as that included in FIG. 1, many storage drives are included, and only a particular processor manages a subset of the total storage drives. The first processor is allowed to enumerate and initialize a subset of the storage drives that it is to manage. Similarly, other processors will enumerate and initialize different subsets of the storage drives. In this manner, each processor can have access to all storage drives via a PCIe fabric or Ethernet tunnel, but only physically manage a subset of the storage drives on a PCIe back end data plane. Thus, a large shared storage space can be provided using many different processors, with each processor only managing a small associated portion of the total storage space.

Normally, each processor will want to enumerate and initialize all the storage drives that each processor "sees" over the PCIe bus, which would include all the storage drives of a storage system since all storage drives are connected to all processors via a shared back end PCIe switch fabric, such as found in FIG. 8. By segregating a back end data plane initialization process for each processor, the storage drives can be allocated among the various processors even though a shared front end data plane PCIe address space is employed across all processors.

When a particular processor fails, then the storage drives managed by that particular processor can be re-assigned to another processor for managing storage operations. An initialization process can be performed between the storage drives associated with the failed processor and the replacement processor to enumerate those storage drives with the replacement processor. The replacement processor is configured to handle transactions addressed to the failed processor's address space, in addition to any address spaces the replacement processor might have previously managed.

Figure 7:
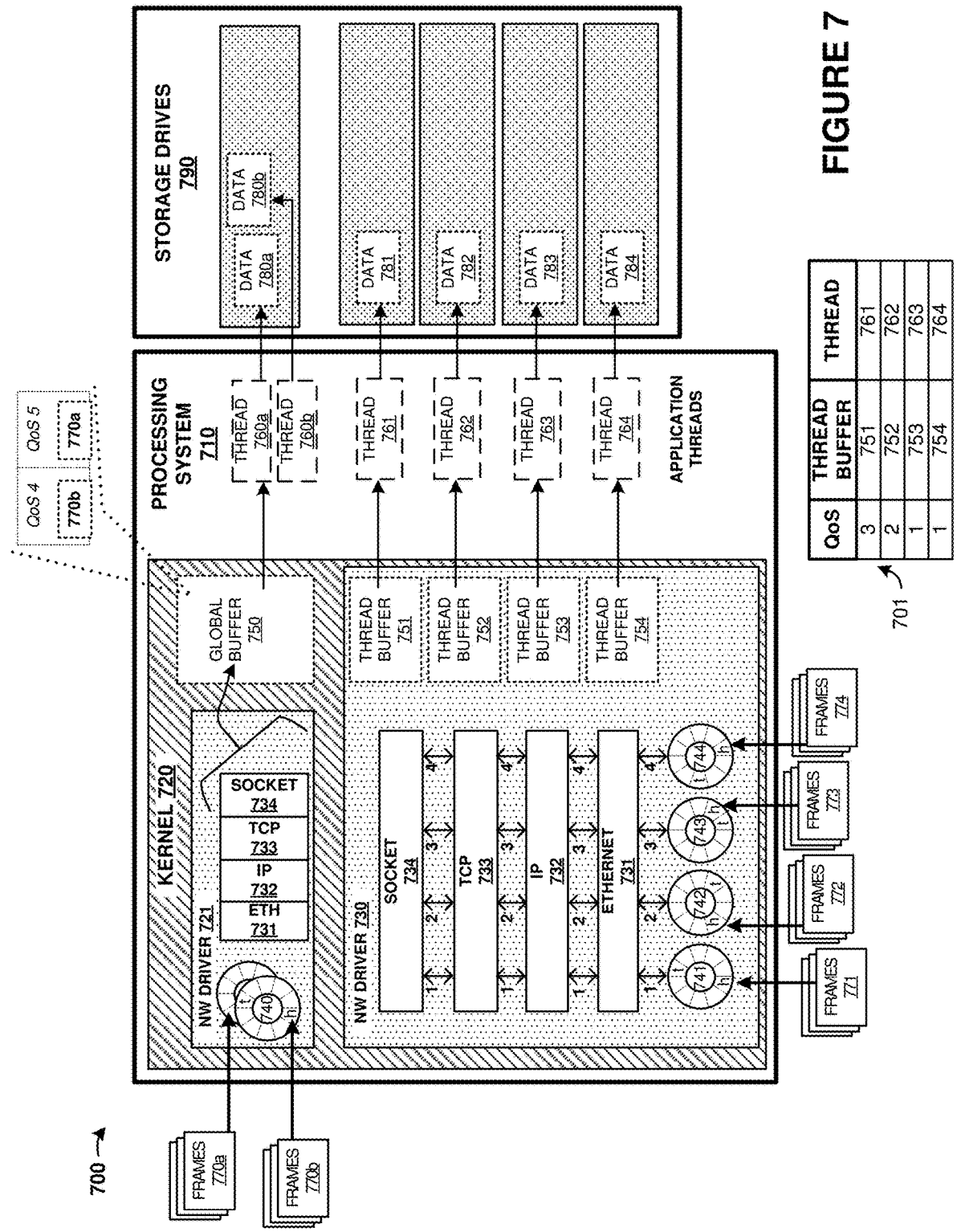
FIG. 7 is a block diagram illustrating a storage system.

As a further example of an enhanced buffer structure using quality of service considerations, FIG. 7 is presented. FIG. 7 is a system diagram illustrating a storage system. Storage system 700 includes processing system 710 and storage drives 790. Processing system 710 can be included in a processing module or processing node, such as processing module 830 in FIG. 8, although variations are possible. Storage drives 790 each include one or more data storage drives, such as solid state storage drives (SSDs) or hard disk drives, among other data storage devices. Storage drives 790 can be coupled to processing system 710 over one or more storage interfaces, such as the PCIe fabric discussed below, among other storage interfaces such as NVMe, Serial Attached SCSI (SAS), FibreChannel, Thunderbolt, or Serial Attached ATA Express (SATA Express).

In operation, processing system 710 receives a plurality of network traffic over one or more network interfaces. This network traffic can be transported over an Ethernet network, among other network, network types, or network links. The network traffic carries one or more storage operations for handling by processing system 710. These storage operations can include read operations or write operations which can retrieve or store data on any of storage drives 790.

Processing system 710 includes kernel 720 which comprises a kernel portion of an operating system executed by processing system 710, such as a Linux, BSD, Windows, OSX, or other operating system, including combinations and variations thereof. Within kernel 720 one or more network drivers are included to handle network traffic for kernel 720. A first network driver 721 is included to show a shared global buffer, while a second network driver 730 is shown as having various enhancements that provide for individualized buffers for threads executed by processing system 710.

Turning first to network driver 721, one or more sets of Ethernet frames 770a-770b are received into ring buffers 740 of network driver 721. In this example, frames 770a are associated with a first thread 760a while frames 770b are associated with a second thread 760b.

Network driver 721 handles frames through the associated network stack and associated network layers 731-734. A global buffer 750 is used to handle transfer of control information and the frames between the various layers as well as by the associated thread before transfer to the appropriate storage drive. However, in kernel 720 a single data structure is employed with a single resource lock for frames received into network driver 721. If a first layer of the network stack, such as IP 732 is currently processing a portion of the packet or frame it must do so by first locking an associated resource in global buffer 750. Other layers of the network stack and other threads must wait until the resource lock has been relinquished by IP 732 before those other layers can operate on data in global buffer 750. Likewise, at the application layer, such as in thread 760a, a resource lock is placed on data in global buffer 750 and concurrent thread 760b must wait until this resource lock is released before operating on data in global buffer 750. In this manner, if more than one thread is employed by kernel 720 for network driver 721 then a sequential or lock-release process must occur among the various threads. This can lead to slowdowns and bottlenecks in frame/packet processing when many threads are employed.

Turning now to the enhanced operation, namely for network driver 730, several thread-specific buffers 751-754 are employed. These buffers are included in network driver 730 instead of globally in kernel 720 in this example, although they could instead be included in other software portions of kernel 720. Each buffer 751-754 comprises one or more data structures which can have a resource lock established independently of each other buffer.

Thus, when operating in a multi-threaded environment as shown, such as a thread number of 4, then four separate streams of frames 771-774 can be received simultaneously into an associated ring buffer 741-744 before entry into the individual thread buffer 751-754. Four independent contexts are shown in network driver 730, namely 1-4, which can handle network stack processing for each associated thread 761-764. As the frames/packets are processed by each layer of network driver 730, then each can have an associated resource lock established independently on a per-thread basis.

Thus, while a first thread 761 is operating presently at socket layer 734 and has a resource lock on thread buffer 751, other concurrent thread/stack operations can occur. These concurrent thread/stack operations can include a TCP 733 operation associated with thread 762 having a resource lock on thread buffer 752, an Ethernet 731 operation associated with thread 763 having a resource lock on thread buffer 753, and an IP 732 operation associated with thread 764 having a resource lock on thread buffer 754. Advantageously, all four threads can be operating on separate data structures established in thread buffers 751-754 simultaneously. The resource lock is established on a per-buffer basis and allows multiple threads to not have to wait for a global resource lock among each other as in network driver 721. Associated data 781-784 can be stored concurrently in storage drives 790 once network stack processing has completed for each thread.

In addition to per-thread buffering and associated buffer resource locking discussed in FIG. 7, further per-thread performance can be enhanced with different service levels or quality of service (QoS) priorities for each thread. A tiered priority is shown in FIG. 7, with five (5) levels of priority assigned to the various threads. Thread buffers 751-754 are each assigned to a different QoS among levels 1-3 noted in table 701. Global buffer 750 has two QoS levels assigned thereto for each of threads 760a and 760b, and in this example, are of a lower QoS level than levels 1-3, although the numbering of QoS levels is merely exemplary.

Traffic, such as the frames noted in FIG. 7, can be received into each associated buffer structure. However, the servicing of each thread can vary based on the associated QoS level. For example, thread buffer 751 is assigned a QoS of 3, thread buffer 752 is assigned a QoS of 2, and thread buffers 753-754 are assigned a QoS of 4. These QoS levels are associated with buffers in this discussion, but also are associated with a particular thread, as noted in table 701. As traffic is received into each associated buffer, kernel 720 or an associated network driver services the frames through the associated network stack processing according to the QoS. Processing priority, time slices, resources, clock cycles, or any resource sub-division or allocation can be used to allocate priority according to the assigned QoS. Thus, each thread in FIG. 7 can receive a different level of service and a different priority when associated traffic or frames propagate up the network stack of the associated network driver. It should be noted, that the QoS prioritization can be applied to both single-thread buffers as well as multi-thread buffers, and QoS prioritization can be established on a per-thread basis or a per-buffer basis, among other segregations.

In addition to having tiered buffering or buffering based on service levels mentioned above, system 700 can pre-allocate buffering resources on a QoS basis or on a per-nexus basis before packets are received for handling by processing system 710. For example, portions of buffers 750-754 can be spawned or pre-allocated by processing system 710 when a new thread is established by an end user device. The pre-allocation can be performed for only certain QoS levels, such as high-priority threads (i.e. threads with a QoS of 2 or higher). In a specific example, a thread assigned a QoS of 1 can have buffer resources allocated by processing system 710 responsive to establishment of the thread, but before any storage frames or packets associated with that thread are received by processing system 710. The pre-allocation allows resources to be ready prior to receipt of traffic for a particular thread, preventing any denials or rejections of the traffic by a processor or processing system which becomes too overloaded to handle allocation of buffer space upon receipt of the traffic. These denials would be propagated back to the originating system, such as an end user system, and create slowdowns related to retransmissions among other issues. It should be understood that the pre-allocation can occur in any of the drivers or buffer structures of system 700.

The global buffer regime as discussed in network driver 721 and buffer 750 can be established concurrently with the enhanced network driver 730 to allow for enhanced and legacy network stack operations. More than one network interface might be employed, and a first network interface can handle high-volume storage transactions using the multi-buffer approach in network driver 730, while a second network interface can handle low-volume traffic (such as control traffic or sideband communications) using the global buffer approach. Various flags can be included in the frames themselves (such as a bit in a header) or in the network driver source code which can indicate which pathway should be used for a particular frame or driver instance.

FIG. 8 is a system diagram illustrating storage assembly 800. Storage assembly 800 includes three different module types in FIG. 8, namely storage sleds 810, input/output (I/O) modules 820, and processing modules 830. In this example, 8 storage sleds, 2 I/O modules, and 3 processing modules are included. However, it should be understood that any number of storage sleds 810, I/O modules 820, and processing modules 830 can be included. Additionally, power supply modules and associated power and control distribution links can also be included, but are omitted in FIG. 8 for clarity.

A module typically comprises physical support structure and enclosure that includes circuitry, printed circuit boards, semiconductor systems, and structural elements. The modules are insertable and removable from a rackmount style of enclosure. In some examples, the elements of FIG. 8 are included in a unit chassis for mounting in a larger rackmount environment such as found in FIG. 1. It should be understood that the elements of FIG. 8 can be included in any physical mounting environment, and need not include any associated enclosures or rackmount elements.

A plurality of storage sleds 810 are included in system 800. Each storage sled 810 includes one or more storage drives, such as four in some examples. Each storage sled 810 also includes Peripheral Component Interconnect Express (PCIe) switches, processors, and control system elements. PCIe switches of each storage sled 810 communicate with one or more on-sled storage drives over associated PCIe links. PCIe switches of each storage sled 810 also are communicatively coupled to an on-sled processor or control system for traffic statistics retrieval and status monitoring, among other operations. PCIe switches of each storage sled 810 communicate over one or more PCIe links 840 with an associated PCIe switch fabric 821 of an I/O module 820.

PCIe switch fabric 821 comprises one or more PCIe switches which communicate over PCIe links 842 with PCIe switch fabric 832 of one or more processing modules 830. PCIe switch fabric 832 communicates with one or more associated processing systems 831 over PCIe links 836. I/O modules 820 each employ PCIe switch fabric 821 for interconnecting processor modules over PCIe links 841, such as processor modules 830. A portion of PCIe switch fabric 821 is included for this processor module cross-connect, and communicate with a PCIe switch fabric 832 in associated processing modules 830 over processor module cross-connect links 841. PCIe switch fabric 821 can also each include unit or cluster cross-connect links 843, which are used to expand the PCIe fabric to other physical unit enclosures. In the example in FIG. 8, PCIe switch fabrics 821 and 832 (and associated PCIe links) are included in a PCIe fabric of system 800, and used for carrying user data between storage sleds 810, processing modules 830, and network interfaces 844-845.

Each processing module 830 communicates over one or more PCIe links 836 through PCIe switch fabrics 821 and 832 with external expansion cards or external PCIe ports. In some examples, the external network expansion cards include network interface cards for communicating over TCP/IP (Transmission Control Protocol (TCP)/Internet Protocol) networks or for carrying iSCSI (Internet Small Computer System Interface) or NVMe (NVM Express) traffic, such as iSCSI or NVMe frames directed to one or more data storage drives of storage assembly 800. These external network links are illustrated by external network interfaces 844 coupled over PCIe links 834. External access to storage assembly 800 is provided over ones of packet network links provided by external network interfaces 844, such as for end user access to data stored on storage sleds 810. In this example, various frames or packets which contain storage transactions or storage operations for any of storage sleds 810 can be received over external network interfaces 844, such as frames 371-372 Likewise, data or response signaling associated with the storage operations can be transferred over interfaces 844 for delivery to end users.

Each processing module 830 can also communicate with other processing modules, such as those in other storage assemblies, over one or more inter-module packet network interfaces 845 coupled over PCIe links 834. In some examples, module packet network interfaces 845 include network interface cards for communicating over Ethernet or TCP/IP (Transmission Control Protocol (TCP)/Internet Protocol) networks for exchanging storage packets between processing modules. In addition to external network interfaces 844 and inter-module network interfaces 845, queue 850 is included and associated with these network interfaces.

The PCIe switches and fabrics discussed herein can comprise one or more PCIe crosspoint switches, which logically interconnect various ones of the associated PCIe links based at least on the traffic carried by each PCIe link. Each PCIe switch port can provide logical isolation between endpoints or groups of endpoints using non-transparent (NT) ports or domain-based logical isolation. An NT port can allow some logical isolation between endpoints, much like a bridge, while a transparent port does not allow logical isolation, and has the effect of connecting endpoints in a purely switched configuration. Access over an NT port or ports can include additional handshaking between the PCIe switch and the initiating endpoint to select a particular NT port or to allow visibility through the NT port. In other examples, a domain-based PCIe signaling distribution can be included which allows segregation of PCIe ports of a PCIe switch according to user-defined groups.

PCIe can support multiple bus widths, such as ×1, ×4, ×8, ×16, and ×32, with each multiple of bus width comprising an additional "lane" for data transfer. PCIe also supports transfer of sideband signaling, such as System Management Bus (SMBus) interfaces and Joint Test Action Group (JTAG) interfaces, as well as associated clocks, power, and bootstrapping, among other signaling. Although PCIe is used in FIG. 8, it should be understood that different communication links or busses can instead be employed, such as NVMe, Ethernet, Serial Attached SCSI (SAS), FibreChannel, Thunderbolt, Serial Attached ATA Express (SATA Express), among other interconnect, network, and link interfaces. Any of the links in FIG. 8 can each use various communication media, such as air, space, metal, optical fiber, or some other signal propagation path, including combinations thereof. Any of the links in FIG. 8 can include any number of PCIe links or lane configurations. Any of the links in FIG. 8 can each be a direct link or might include various equipment, intermediate components, systems, and networks. Any of the links in FIG. 8 can each be a common link, shared link, aggregated link, or may be comprised of discrete, separate links.

In FIG. 8, any processing system 831 on any processing module 830 has logical visibility to all storage drives in all storage sleds 810. Any processing system 831 can transfer data for storage on any storage drive and retrieve data already stored on any storage drive. Thus, 'm' number of storage drives can be coupled with 'n' number of processors to allow for a large, scalable architecture with a high-level of redundancy and density.

To provide visibility of each processing system 831 to any storage sled 810, various techniques can be employed. In a first example, a particular processing system 831 manages (instantiates/binds) a subset number of the total quantity of storage sleds, such as 16 storage drives spanning 4 storage sleds, and handles transactions for that subset of storage drives, such as read and write transactions. Each processing system 831, however, has memory-mapped or routing-table based visibility to the storage drives managed by any other processing system 831 or processing systems in other storage assemblies. When a storage operation is desired for a storage drive not managed by a particular processing system, the particular processing system uses the memory mapped access or routing-table based visibility to direct the storage operation to the proper storage drive for that transaction. The transaction can be transferred and transitioned to the appropriate processing system that manages that storage drive associated with the data of the transaction. The PCIe fabric, namely PCIe switch fabrics 821 and 832 (or alternatively inter-module network interfaces 845), are used to transfer data between processing systems so that a particular processing system or processor can store the data in the storage sled or sleds that is managed by that particular processing system, even though the data might be received over a network interface associated with a different processing system.

In this example, the PCIe interfaces associated with each processing system 831 have 64-bit address spaces, which allows an addressable space of $2^{64}$ bytes, leading to at least 16 exbibytes of byte-addressable memory. The 64-bit PCIe address space can shared by all processing systems 831 for memory mapping to storage drives on storage sleds. Thus, while each particular processing system 831 actually manages a subset of the total storage drives on storage sleds, all processors 831 have visibility to, and can initiate read/write transactions to, any of storage drives on storage sleds. A managing processing system 831 that manages a particular storage drives on storage sleds receives write/read transactions and any associated data from an initiating processing system 831 by at least using a memory-mapped address space or routing table to establish which processing module handles storage operations for a particular set of storage sleds.

In operation, such as storage operations, data or storage requests can be received over portions of external network interfaces 844 by any processing system 831 of any processing module 830. For example, the write operation can be a write operation received over external network interfaces 844 from an end user employing an iSCSI protocol or NVMe protocol. The processing system that receives the storage operation determines if it physically manages the storage drive or drives associated with the storage operation, and if it does, then the processing system handles the storage operation, such as transferring write data for storage on the associated storage drives over the PCIe fabric(s). If the processing system determines that it does not physically manage the storage drive or drives associated with the storage operation, then the processing system transfers the storage operation to another processing module that includes the processing system that does manage the storage drive or drives over the PCIe fabric(s), over inter-module network interfaces 845, or a combination thereof. Data striping can be employed by any processing system to stripe data for a particular storage transaction over any number of storage drives, such as over all of the storage sleds that include storage drives managed by the particular processing system.

In a further operation, the processing system that receives the storage operation determines if it physically manages the storage drive or drives associated with the storage operation, and if it does, then the processing system handles the storage operation with the associated storage drives over the PCIe fabric(s) according to an associated priority or QoS. If the processing system determines that it does not physically manage the storage drive or drives associated with the storage operation, then the processing system transfers the storage operation to another processing module that includes the processing system that does manage the storage drive or drives over either the PCIe fabric(s) or over inter-module network interfaces 845. Data striping can be employed by any processing system to stripe data for a particular storage transaction over any number of storage drives, such as over all of the storage sleds that include storage drives managed by the particular processing system.

Queue 850 includes one or more priority levels for prioritizing handling of storage operations received by any of external network interfaces 844 and inter-module network interfaces 845 before handling by processing system 831. As shown in FIG. 8, queue 850 includes 1-N sub-queues for prioritizing the handling of the associated storage operations. Example storage frames 871 and 872 can be received over external network interfaces 844 into queue 850. In a first queue priority level, one storage operation 'c' is listed which was received into queue 850 after storage operations 'a' and 'b'. Due to the priority of sub-queue '1' this storage operation 'a' can be handled for storage sleds 810 before storage operations 'a' and 'b'. Storage operations 'b' and 'e' are also handled from sub-queue '2' before storage operations 'a' and 'f'.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A data storage apparatus, comprising:
   a processor configured to:
   assign service levels in a queue for handling storage operations directed to one or more data storage drives;
   pre-allocate resources in the queue for selected ones of the service levels before ones of the storage operations associated with the selected ones of the service levels are
   received by the processor;
   receive the storage operations; and
   based at least on the service levels, service the storage operations from the queue with the one or more data storage drives.

2. The data storage apparatus of claim 1, comprising:
   the processor configured to:
   establish logical storage units (LUNs) among the one or more data storage drives and present the LUNs to one or more host systems; and
   assign individual service levels in the queue according to at least the LUNs and service the storage operations from the queue according to the individual service levels.

3. The data storage apparatus of claim 1, comprising:
   the processor configured to:
   establish a plurality of nexus arrangements across the one or more data storage drives, the nexus arrangements each comprising an iSCSI (Internet Small Computer System Interface) target identifier, iSCSI logical unit (LUN), and iSCSI client identifier; and
   assign individual service levels in the queue according to at least the nexus arrangements and service the storage operations from the queue according to the individual service levels.

4. The data storage apparatus of claim 1, comprising:
   the processor configured to:
   receive over the one or more network interfaces second storage operations directed to a set of data storage drives managed by a second processor; and
   transfer the second storage operations for delivery to the second processor without regard to a service level associated with the second storage operations.

5. The data storage apparatus of claim 4, comprising:
   the processor configured to:
   transfer the second storage operations to the second processor over a Peripheral Component Interconnect Express (PCIe) fabric, wherein the second processor is configured to assign further service levels to the second storage operations in an associated queue and service the second storage operations from the associated queue based at least on the further service levels.

6. The data storage apparatus of claim 1, comprising:
   the processor configured to assign the service levels in the queue according to enhanced message signaling interrupt (MSI-X) type of application threads associated with the storage operations.

7. The data storage apparatus of claim 6, comprising:
   the processor configured to identify which application threads are associated with each of the storage operations according to nexus arrangements each comprising an iSCSI (Internet Small Computer System Interface) target identifier, iSCSI logical unit (LUN), and iSCSI client identifier.

8. The data storage apparatus of claim 1, wherein the queue is associated with one or more network interfaces that receive the storage operations as iSCSI (Internet Small Computer System Interface) traffic over one or more network links.

9. The data storage apparatus of claim 1, comprising:
   the processor configured to identify the selected ones of the service levels to pre-allocate resources based on at least one of an iSCSI (Internet Small Computer System Interface) target identifier, iSCSI logical unit (LUN), iSCSI client identifier, or application thread.

10. A method, comprising:
    assigning service levels in a queue to storage operations directed to one or more data storage drives;
    pre-allocating resources in the queue for selected service levels before receipt of ones of the storage operations associated with the selected service levels;
    receiving the storage operations; and
    based at least on the service levels, servicing the storage operations from the queue with the one or more data storage drives.

11. The method of claim 10, further comprising:
    establishing logical storage units (LUNs) among the one or more data storage drives and presenting the LUNs to one or more host systems; and
    assigning individual service levels in the queue according to at least the LUNs and servicing the storage operations from the queue according to the individual service levels.

12. The method of claim 10, further comprising:
    establishing a plurality of nexus arrangements across the one or more data storage drives, the nexus arrangements each comprising an iSCSI (Internet Small Computer System Interface) target identifier, iSCSI logical unit (LUN), and iSCSI client identifier; and
    assigning individual service levels in the queue according to at least the nexus arrangements and servicing the storage operations from the queue according to the individual service levels.

13. The method of claim 10, further comprising:
    receiving into a first processor, over one or more network interfaces, second storage operations directed to a set of data storage drives managed by a second processor; and
    in the first processor, transferring the second storage operations for delivery to the second processor without regard to a service level associated with the second storage operations.

14. The method of claim 13, further comprising:
    in the first processor, transferring the second storage operations to the second processor over a Peripheral Component Interconnect Express (PCIe) fabric, wherein the second processor is configured to assign further service levels to the second storage operations in an associated queue and service the second storage operations from the associated queue based at least on the further service levels.

15. The method of claim 10, further comprising:
assigning the service levels in the queue according to enhanced message signaling interrupt (MSI-X) type of application threads associated with the storage operations.

16. The method of claim 15, further comprising:
identifying which application threads are associated with each of the storage operations according to nexus arrangements each comprising an iSCSI (Internet Small Computer System Interface) target identifier, iSCSI logical unit (LUN), and iSCSI client identifier.

17. The method of claim 10, wherein the queue is associated with one or more network interfaces that receive the storage operations as iSCSI (Internet Small Computer System Interface) traffic over one or more network links.

18. The method of claim 10, further comprising:
identify the selected service levels to pre-allocate resources based on at least one of an iSCSI (Internet Small Computer System Interface) target identifier, iSCSI logical unit (LUN), iSCSI client identifier, or application thread.

19. A data storage system, comprising:
a plurality of data storage drives; and
a processor;
the processor configured to:
pre-allocate resources in a queue for at least a selected priority level before storage operations associated with at least the selected priority level are received by the processor;
receive the storage operations directed to the plurality of data storage drives;
assign individual priority levels in the queue to first ones of the storage operations that are managed by the processor and transfer second ones of the storage operations that are not managed by the processor for delivery to another processor; and
service the first ones of the storage operations from the queue based at least on the individual priority levels.

20. The data storage system of claim 19, comprising:
the processor configured to:
establish a plurality of nexus arrangements across the plurality of data storage drives, the nexus arrangements each comprising an iSCSI (Internet Small Computer System Interface) target identifier, iSCSI logical unit (LUN), and iSCSI client identifier; and
the processor configured to assign the individual priority levels in the queue according to at least the nexus arrangements and service the storage operations from the queue according to at least the individual priority levels.

* * * * *